United States Patent Office 3,542,733
Patented Nov. 24, 1970

3,542,733
METHOD OF PREPARING POLY (HYDROXY-ETHERS) BASED POLYESTERS
Sachio Nishimura, Naoaki Hata, and Yasusi Nakamura, Tokyo, Japan, assignors to Asahidenka Kogyo Kabushiki Kaisha, Tokyo, Japan, a Japanese corporation
No Drawing. Filed Aug. 22, 1966, Ser. No. 573,846
Claims priority, application Japan, Aug. 20, 1965, 40/50,653, 40/50,654; Jan. 12, 1966, 41/1,486, 41/1,487; Jan. 21, 1966, 41/3,447; Mar. 28, 1966, 41/19,076
Int. Cl. C08g 17/08, 17/13, 33/10
U.S. Cl. 260—47    5 Claims

ABSTRACT OF THE DISCLOSURE

The invention relates to novel linear thermoplastic poly (hydroxy-ether) polyesters having relatively high molecular weights and suitable for coating, laminating, film making and molding, prepared by reacting an alicyclic dicarboxylic acid halide with a poly(hydroxyether) prepolymer in the presence of an acid accepting agent and a basic catalyst.

---

This invention relates to novel poly(hydroxyethers) based thermoplastic polyesters and to a method for their preparation. More particularly, this invention relates to novel thermoplastic polyesters which have relatively high molecular weights and are prepared by reacting dibasic acid halides defined hereinunder with poly(hydroxyethers) defined hereunder and are characterized by having excellent heat distortion stabilities, impact resistances and desired physical properties of high molecular weight poly(hydroxyethers) resins derived from bisphenols and epihalohydrins.

Thermoplastic poly(hydroxyethers) resins are known in the art and are disclosed well in the patent literatures including Japanese patent publication No. 20,988/63, 1,840/64. And the poly(hydroxyethers) resins are prepared by a method conducted by admixing a bisphenol and about one mole of an epihalohydrin or a diglycidyl ether of bisphenol, per mole of bisphenol, together with an alkali metal hydroxide, generally in an aqueous medium at a temperature of about 20° C. to boiling or reflux, but it is difficult to prepare a poly(hydroxyether) resin which has a sufficiently high molecular weight and a substantially linear structure for the methods have the defects described hereinunder:

(1) While it is necessary for obtaining linear polymer to carry out the reaction at a temperature below 50° C., it is difficult to accomplish the reaction and to obtain high molecular weight polymers by carrying out the reaction at a temperature below 60° C.

(2) While it is necessary for the growth of the polymer in molecular weight to carry out the reaction at a temperature above 60° C., not only the desired reaction summarized in the following Equation 1 but also the branching reaction occur considerably at a temperature above 60° C., (1)

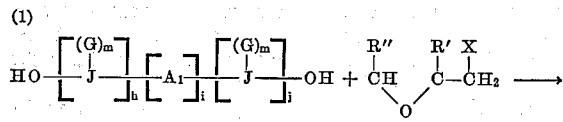
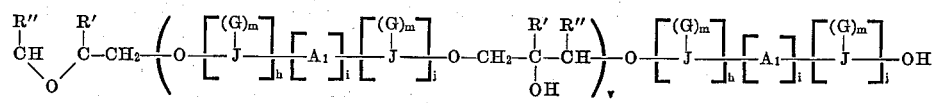

wherein J, $A_1$, X, G, h, i, j and m have the same significance as defined hereinunder; v and z represent whole numbers greater than one, and the branching reaction is described in many literatures including the Journal of Polymer Science Part A, vol. 2, pages 2,631 to 2,645 (1964). Therefore, in the case that one wants to get a linear poly (hydroxyether) resin having high melt index by the known methods, a resin having poor thermal stability and poor physical strength is obtained. On the contrary, in the case that one wants to get a relatively high molecular weight poly(hydroxyether) resin having physical strength, one gets a resin having high resistance to flow or containing gel.

The well-known poly(hydroxyether) resins have a Melt Index of from about 0.3 to about 3 gr./10 mm. (according to ASTM test designation D–1,238 procedure at 220° C., under 44 p.s.i.), Heat Distortion Temperature of about 86 to about 91° C. under 66 p.s.i. and of about 80 to about 86° C. under 264 p.s.i. (according to ASTM test designation D–648 procedure), notched Izod impact strength of about 2 to about 5 ft. lb./in. (notch) according to ASTM test designation D–256 procedure), unnotched Izod impact strength of about 60 to about 70 ft. lb./in. (2.5″), Flexural strength of about 14,000 to about 17,000 p.s.i.×$10^5$, tensile modulus of about 3.3 to about 3.5 p.s.i.×$10^5$ and volume resistivity of about 4 to about 5 ohm-cm.×$10^{16}$.

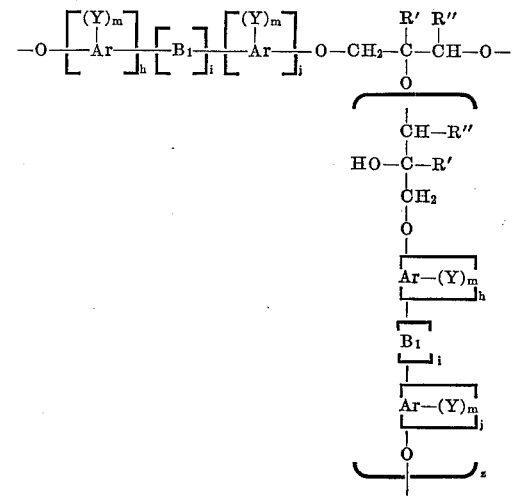

Thus, compared with the well-known polycarbonates, the volume resistivity of the poly(hydroxyether) resin is about 150% higher and the flexural strength of the poly (hydroxyether) resin is about 50% higher and the tensile modulus of the poly(hydroxyether) is about 10% higher and the resistance to flow is lower and the unnotched Izod impact strength is similar, but the heat distortion temperature of the poly(hydroxyether) shows considerably lower value and the notched Izod impact strength of the poly (hydroxyether) is remarkably lower.

It is an object of this invention to provide a method for preparing a novel thermoplastic poly(hydroxyether) based polyester having sufficiently high molecular weight.

A particular object of this invention is to provide a method for preparing a poly(hydroxyether) based polyester which is comparable to polycarbonate in the heat distortion temperature and in the notched Izod impact strength and also is comparable to poly(hydroxyether) resin in a number of the excellent properties of the poly (hydroxyether) resin which are shown heretofore.

Further object of this invention is to provide a novel thermoplastic resin having excellent physical and chemical properties suited for coating, laminating, film making and molding.

Another object of this invention is to provide a novel thermoplastic resin for preparing coating, lamination or film having low gas permeability.

The poly(hydroxyethers) based polyesters of this invention are, essentially, linear condensation products of the dibasic acid halides defined hereinunder and the poly (hydroxyethers) prepolymers which are, essentially, disclosed hereinunder.

And the poly(hydroxyethers) based polyesters of this invention contain, essentially, structural units of following formulas:

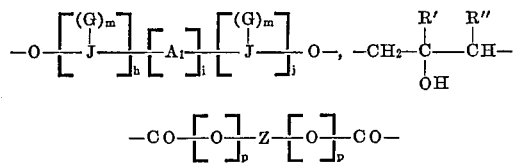

and the polyester of this invention has an average composition which comforms to and may be represented typically by the following formula:

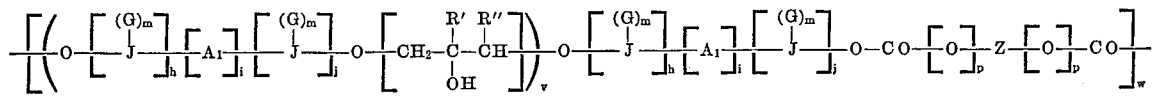

(wherein J, $A_1$, R', R'', G, Z, h, i, j, m and p have the same significance as defined hereinunder; v represents a whole number greater than one, ranges preferably 2 to 19; w represents a whole number greater than one.)

The method of this invention, for preparing the poly (hydroxyethers) based polyesters, comprises essentially, condensing (A) a poly(hydroxyether) prepolymer (I) containing two terminal phenolic hydroxyl groups with (B) a dibasic acid halide (II) represented by the following general formula (1) in the presence of (C) a strongly basic compound (III), e.g. an alkali metal hydroxide, as an acid acceptant and (D) a catalytic amount of basic catalyst (IV) at a suitable temperature, preferably at about 0° C. to about 50° C.; said poly(hydroxyether) prepolymer (I) is prepared by reacting (A-1) a molar excess amount of bisphenol (a) with (A-2) an epihalohydrin (b) defined hereinunder in one, two or more steps reaction procedure as disclosed hereinunder; said dibasic acid halide (II) contains at least one carbon to carbon ring and has two terminal —CO—X groups, where X has the same significance defined in the Formula 1, and is selected from the group consisting of acid dihalides of aromatic dicarboxylic acid, acid dihalides of alicyclic dicarboxylic acid, bishaloformates of dihydric phenols, bishaloformates of dihydric alcohols, other dibasic acid halides represented by the Formula 1 and the mixture thereof; the ratio of said poly(hydroxyether) prepolymer (I) to said dibasic acid halide is preferably in the proportion of from 0.985 to 1.015 of phenolic hydroxyl groups of said poly(hydroxyether) prepolymer (I) per about one —CO—X group of said dibasic acid halide (II), where —CO—X has the same significance defined in the Formula 1; the ratio of said strongly basic compound (III) to said poly(hydroxyether) prepolymer (I) is in the proportion of one or more than one equivalent weight of base per one equivalent phenolic hydroxyl group of said poly(hydroxyether) prepolymer (I).

The dibasic acid halides (II) used for preparing the poly(hydroxyethers) based polyesters of this invention are represented by the following general Formula 1, and the term "dibasic acid halides (II)" used in this specification means acid dihalides, bishaloformates and mixture thereof which are represented by the general Formula 1:

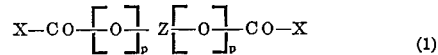

wherein X is a halogen atom selected from the group consisting of chlorine atom and bromine atom; Z represents a divalent group having the following formula:

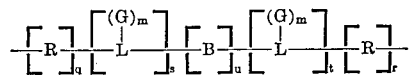

wherein L is a hydrocarbon residue selected from the group consisting of aromatic hydrocarbon residues and alicyclic hydrocarbon residues; —A— is a member selected from the group consisting of:

(1) the divalent groups —D— where —D— is a divalent aliphatic hydrocarbon residue of up to six carbon atoms; (2) the divalent groups —D—E— where —D— has the same significance defined heretofore and E is an atom selected from the group consisting of O and S; (3) the divalent groups —D—E—D where —D— and E have the same significance defined heretofore; (4) —O—; (5) —S—; (6) —SO₂—; (7) —O—CO—O— and (8) —CO—;

R is a divalent aliphatic hydrocarbon residue attached directly to ring carbon of L; G represents a halogen atom or alkyl group; m ranges zero to a whole number of replaceable hydrogens substituted on the hydrocarbon residue; q and r range zero to one; s and t range zero to one, however s+t range one to 2; W ranges zero to one, however, when s is zero, W must be zero and when s+t is one, u must be zero; p ranges zero to one.

The poly(hydroxethers) prepolymers (I) used for preparing the poly (hydroxyethers) based polyesters of this invention have an average composition which comforms to and may be represented typically by the following Formula 2:

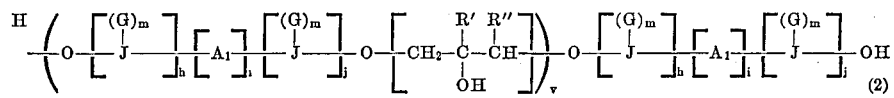

(wherein v represents a whole number greater than one, and is preferably not more than 19 and ranges most preferably from 2 to 9; and other various letters have the same significance defined hereinunder).

Illustratives of the bishpenol (a) which can be used for preparing the poly(hydroxyethers) prepolymers (I) are those having the following general Formula 3:

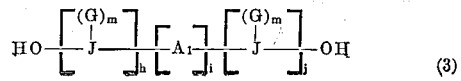

wherein $h$, $i$ and $j$ range zero to one, however $h+j$ ranges one to two; J is an aromatic divalent hydrocarbon radical such as naphthylene and phenylene with phenylene being preferred for purposes of this invention; G is alkyl radical such as methyl, n-propyl, n-butyl, n-hexyl, n-octyl and the like, preferably alkyl radical having a maximum of 4 carbon atoms; or halogen atom, i.e., chlorine, bromine, iodine, or fluorine.

It is to be understood that whenever there are substituents exclusive of the hydroxyl groups on either or both of the aromatic divalent hydrocarbon groups, that these substituents can be the same or different; $m$ is an integer having a value of from 0 to a maximum value corresponding to the number of hydrogen atoms on the aromatic ring (J) with which can be replaced by substituents and can have the same or different values; and $A_1$ is a divalent radical, as for example

or —O—, or —S—, or —SO—, or —SO$_2$—, or a divalent hydrocarbon radical as, for example, an alkylene radical such as methylene, ethylene, trimethylene, tetramethylene, pentamethylene, hexamethylene, 2-ethyl hexamethylene, octamethylene, nonamethylene, decamethylene, and the like; an alkylidene radical such as ethylidene, propylidene, isopropylidene, isobutylidene, amylidene, isoamylidene, 1-phenyl ethylidene and the like, or a cycloaliphatic radical, such as 1,4-cyclohexylene, 1,3-cyclohexylene, cyclohexylidene, and the like, or halogenated alkylidene, alklene or cycloaliphatic radicals, alkoxy and aryloxy substituted alkylidene, alkylene or cycloaliphatic radicals, such as methoxy methylene, ethoxy methylene, ethoxy ethylene, 2-ethoxy trimethylene, 3-ethoxy pentamethylene, 1,4-(2-methoxycyclohexane), phenoxy ethylene, 2-phenoxy trimethylene, 1,3-(2-phenoxy cyclohexane), and the like, aralkylene radicals, such as phenyl ethylene, 2-phenyl trimethylene, 1-phenyl pentamethylene, 2-phenyl decamethylene, and the like, aromatic radicals, such as phenylene, naphthylene, and the like, halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like, alkyl substituted aromatic radicals, such as 1,4-(2-methylphenylene), 1,4-(2-ethylphenylene), 1,4-(2-n-propylphenylene), 1,4-(2-n-butylphenylene), 1,4-(2-n-dodecylphenylene) and the like; or $A_1$ can be a ring which is fused to one of the J groups as is the case, for example, in the compound having the formula:

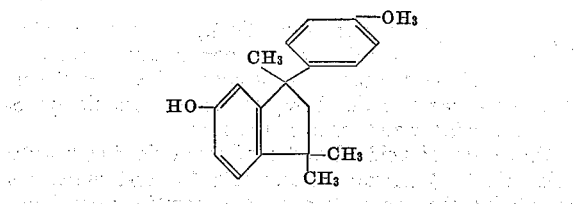

or $A_1$ can be a radical containing a silicon atom as, for example, dimethylsiloxy, diphenylsiloxy, methylphenylsiloxy and the like.

Particularly preferred are the dihydric polynuclear phenols having the general formula:

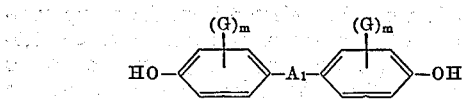

wherein G, is as previously defined, $m$ has a value of from 0 to 4 inclusive and $A_1$ is an alkylene or alkylidene group, preferably having from 1 to 3 carbon atoms inclusive or $A_1$ is a saturated group having the formula:

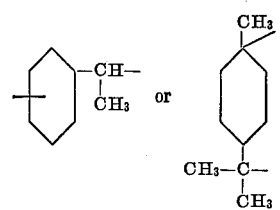

Poly(hydroxyethers) produced using the dihydric polynuclear phenols described in the preceding paragraph have extremely good mechanical properties. In addition poly(hydroxyethers) produced using a dihydric polynuclear phenol wherein $A_1$ is a saturated group having the formula:

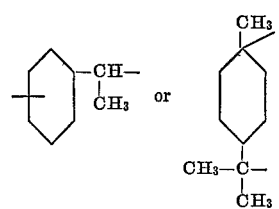

have heat distortion temperatures which are relatively high.

Exemplary of other specific dihydric phenols include among others the bis-(hydroxyphenyl)-alkanes such as 2,2-bis-(p-hydroxyphenyl)-propane, commonly referred to as bisphenol-A, 2,4'-dihydroxy diphenylmethane, bis-(2-hydroxyphenyl) - methane, bis-(4-hydroxyphenyl)-methane, bis - (4 - hydroxy - 2,6-dimethyl-3-methoxyphenyl)-methane, 1,1 - bis-(4-hydroxyphenyl)-ethane, 1,2-bis-(4-hydroxyphenyl) - ethane, 1,1 - bis - (4 - hydroxy - 2 - chlorophenyl) - ethane, 1,1 - bis - (3,5 - dimethyl-4-hydroxyphenyl)-ethane, 1,3 - bis - (3 - methyl - 4 - hydroxyphenyl)propane, 2,2 - bis - (3 - phenyl - 4 - hydroxyphenyl) - propane, 2,2 - bis - (3 - isopropyl-4-hydroxyphenyl)-propane, 2,2 - bis - (2 - isopropyl - 4-hydroxyphenyl) - propane, 2,2-bis-(4-hydroxy-naphthyl)-propane, 2,2 - bis-(4-hydroxyphenyl)-pentane, 3,3-bis-(4-hydroxyphenyl) - pentane, 2,2-bis-(4-hydroxyphenyl)-heptane, bis - (4 - hydroxyphenyl) - phenylmethane, bis - (4 - hydroxyphenyl) - cyclohexylmethane, 1,2 - bis-(4-hydroxyphenyl) - 1,2 - bis - (phenyl) - propane, 2,2 - bis-(4-hydroxyphenyl) - 1 - phenylpropane and the like; dihydroxybiphenyls such as 4,4' - dihydroxybiphenyl, 2,2'-dihydroxybiphenyl, 2,4' - dihydroxybiphenyl and the like; di(hydroxyphenyl) sulfones such as bis - (4 - hydroxyphenyl)-sulfone, 2,4' - dihydroxydiphenyl sulfone, 5' - chloro - 2,4' - dihydroxydiphenyl sulfone, 5'-chloro-4,4'-dihydroxydiphenyl sulfone, 3'-chloro-4,4'-dihydroxydiphenyl sulfone and the like; di(hydroxyphenyl) ethers such as bis-(4-hydroxyphenyl)-ether, the 4,3'-, 4,2'-, 2,2'-, 2,3'-, dihydroxy - diphenyl ethers 4,4' - dihydroxy-2,6-dimethyldiphenyl ether, bis-(4-hydroxy-3-isobutylphenyl)-ether, bis - (4 - hydroxy-3-isopropylphenyl)-ether, bis-(4-hydroxy - 3 - chlorophenyl) - ether, bis - (4 - hydroxy-3 - fluorophenyl) - ether, bis - (4 - hydroxy - 3 - bromophenyl) - ether, bis - (4 - hydroxynaphthyl) - ether, bis-(4 - hydroxy - 3 - chloronaphthyl) - ether, bis - (2 - hydroxybiphenyl)-ether, 4,4'-dihydroxy - 2,6 - dimethoxydiphenyl ether, 4,4' - dihydroxy - 2,5 - diethoxydiphenyl ether, and the like; also suitable are 1,1-bis-(4-hydroxyphenyl) - 2 - phenylethane, 1,3,3-trimethyl-1-(4-hydroxyphenyl) - 6 - hydroxyindane, 2,4 - bis - (p - hydroxyphenyl) 4 methylpentane and the like.

The epihalohydrins (b) which can be used for preparing the poly(hydroxyethers) prepolymers (I) are represented by the following general Formula 4, and the term "epihalohydrins (b)" used in this specification means the compounds and mixture thereof represented by the following Formula 4:

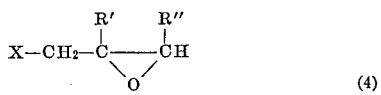
(4)

wherein R' and R" which can be the same or different are hydrogen or methyl and X is a halogen atom, i.e., chlorine, bromine, and the like. Specific epihalohydrins are epichlorohydrin, epibromohydrin, 1,2 - epoxy - 1-methyl - 3 - chloropropane and 1,2-epoxy-2-methyl-3-chloropropane.

The examples of methods for preparing the poly(hydroxyethers) prepolymers (I) include, but are not limited to, the following methods:

(1) A method reacting a bisphenol (a) with from about 0.70 to about 0.95 moles, preferably from about 0.75 to about 0.90 moles, of an epihalohydrin (b), per mole of the bisphenol (a), (2) A method reacting a dihalohydrin ether which is prepared by reacting a bisphenol (a) with a molecular excess amount of epihalohydrin (b), and has the following Formula 2-1:

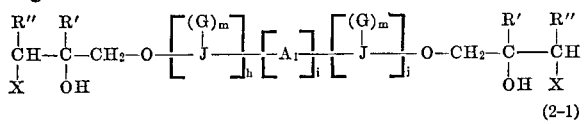
(2-1)

(where various letters have the same significance defined heretofore), with from about 1.1 to about 2.0 moles, preferably from about 1.2 to about 1.6 moles, of bisphenol (a) per mole of the dihalohydrin ether, (3) A method reacting diglycidyl ether which is prepared by reacting a bisphenol (a) with a molar excess amount of epihalohydrin (b), and has the following Formula 2-2:

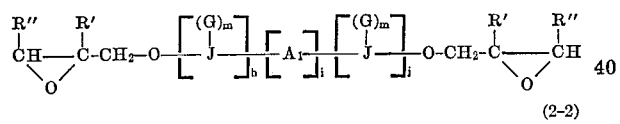
(2-2)

(where various letters have the same significance defined heretofore) with from about 1.1 to about 2.0 moles, preferably from about 1.2 to about 1.6 moles, of bisphenol (a), per mole of the diglycidyl ether, (4) A method reacting a molar excess amount of bisphenol (a) with epihalohydrin (b) and the dihalohydrin ether described above or (and) diglycidyl ether described above.

The method (1), (2) and (4) are conducted by admixing from one or more than one equivalent amount of base, e.g. sodium hydroxide, potassium hydroxide, per equivalent amount of reactive halogen atoms contained in the epihalohydrin (b) and dihalohydrin ether with the materials indicated above.

And a catalyst can be used, if necessary, and in those methods (1) to (4) basic catalysts are preferable and the preferred among them include the basic catalysts (IV) defined in this specification. For an example, the process by which the poly(hydroxyethers) prepolymers (I) which is suitable for preparing gel-free thermoplastic poly(hydroxyethers) based polyesters of this invention is conducted by admixing a bisphenol (a), from about 0.70 to about 0.95 moles of epihalohydrin (b), per mole of the bisphenol (a), together with from about 1.1 to about 1.2 moles, per mole of the epihalohydrin (b), of alkali metal hydroxide such as sodium hydroxide, potassium hydroxide and the like, generally in an aqueous medium at a temperature of about 10° C. to about 80° C.

Careful control of the ratio of phenolic hydroxyl groups to reactive halogen atoms or (and) epoxy groups in the starting materials is of great importance in order to obtain a final product having the desired characteristics such as small resistance to flow and high chemical resistance. For example, in the case that the process is carried with a reaction mixture containing more than 0.96% epoxy group per one phenolic hydroxyl group, it is necessary for accomplishing the reaction to carry at higher temperature and for longer time, and it is inevitable to obtain the poly(hydroxyether) having too high molecular weight and branched structure. And it is very difficult to accomplish the reaction of such a high molecular weight poly(hydroxyether) with a dibasic acid halide (II) without causing any branching or crosslinking reaction, so the product having sufficient physical strength and chemical resistance and good thermoplasticity cannot be obtained. In the case that the process is carried with a reaction mixture containing less than 0.66 epoxy group per one phenolic hydroxyl group, for an example, the reaction product having too small molecular weight or the mixture of hydroxylether and unreacted bisphenol (a) is obtained And the final polymer prepared by condensing such a reaction product with a dibasic acid halide (II) has small Melt Index and poor chemical resistance for the polymer contains too much —CO—O— bonds.

The dibasic acid halides (II) which are useful for preparing the poly(hydroxyethers) based polyesters of this invention include, but are not limited to, (1) Acid dihalides of aromatic dicarboxylic acids (II-1) represented by the following general Formula 1-1, (2) Acid dihalides of alicyclic dicarboxylic acids (II-2) represented by the following general Formula 1-2, (3) Other acid dihalides of dicarboxylic acid (II-3) represented by the following general Formula 1-3, (4) Bishalformates of dihydric phenols (II-4) represented by the following general Formula 1-4, (5) Bishaloformates of dihydric alcohols (II-5) represented by the following general Formula 1-5:

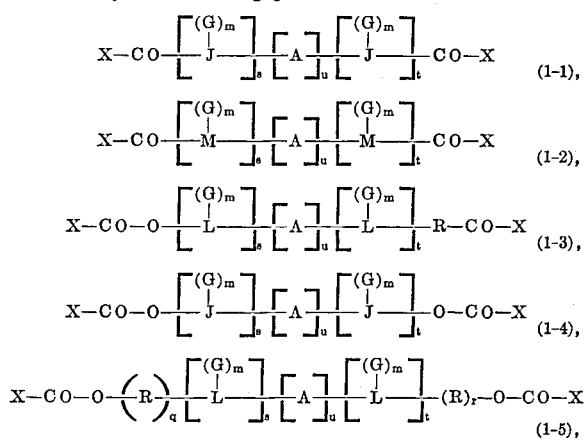

wherein J represents an aromatic hydrocarbon residue; M represents an alicyclic hydrocarbon residue: other various letters have the same significance defined heretofore, however in the case that L represents an aromatic hydrocarbon residue, q and r must not be zero.

One class of acid dihalides of aromatic dicarboxylic acids (II-1-a) having the Formula 1-1 and preferably useful for the preparation of the poly(hydroxyethers) based polyesters of this invention are those of the following general Formula 1-1-a):

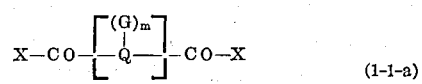
(1-1-a)

wherein A'r is a member selected from the group comprising of m-phenylene group, p-phenylene group, 1,5-naphthylene group, 2,6-naphthylene group, the groups which are derived by substituting them with halogen atom or (and) alkyl groups; X is selected from the group consisting of chlorine atom and bromine atom; —CO— is a carbonyl group, X—CO— is a haloformyl group attached directly to an aromatic ring carbon; Y is a substituted halogen atom; m ranges zero to 4, and examples of the acid dihalides of the aromatic dicarboxylic acids (II–1–a) having the Formula 1–1–a include, but are not limited to, the acid dichlorides and the acid dibromides of the following acids: terephthalic acid, iso-phathalic acid, 1,4-dicarboxyl - 2 - chlorobenzene, 1,4-dicarboxyl-2,5-dichlorobenzene, 1,4-dicarboxyl - 2,3,5,6 - tetrachlorobenzene, 1,5-dicarboxylnaphthalene, 2,6-dicarboxylnaphthalene, 2,7-dicarboxylnaphthalene and the like.

Another class of acid dihalides of aromatic dicarboxylic acids (II–1–b) having the Formula 1–1 and preferably useful for the preparation of poly(hydroxyethers) based polyesters of this invention are those of the following general Formula 1–1–b):

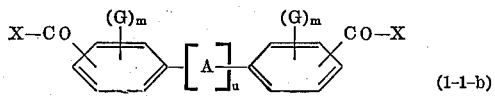

(1-1-b)

wherein A is a member selected from the group consisting of alkylidene groups of up to six carbon atoms, other alkylene groups of up to six carbon atoms, aliphatic glycol residues: —O—CnH2n—O— where n ranges from 2 to 6, aliphatic thioglycol residue: —S—CnH2n—S— where n ranges from 2 to 6, —O—, —S—, —SO2— —O—CO—O— and —CO—; X is selected from the group consisting of chlorine atom and bromine atom;

is selected from the group comprising of m-phenylene group, p-phenylene group and the groups which are derived by substituting them with alkyl groups; G represents a substituted halogen atom; m ranges zero to 4; u ranges zero to one, and examples of the acid dihalides of dicarboxylic acids (II–1–b) having the formula (1–1–b) include, but are not limited to, the acid dichlorides and the acid dibromide of the following acids:

4,4' - dicarboxybiphenyl, 3,3' - dicarboxybiphenyl, 1,1-bis(4 - carboxyphenyl) methane, 1,1 - bis - (4 - carboxyphenyl) - ethane, 2,2 - bis(4 - carboxyphenyl) - propane, 1,4 - bis(4 - carboxyphenyl) - butane, 1,2 - bis(4 - carboxyphenoxy) - ethane, 1,3 - bis(4 - carboxyphenoxy)-propane, 1,2 - bis(4 - carboxy - phenothio) - ethane, 1,4-bis(4 - carboxyphenoxy) - butane, 1,5 - bis(4 - carboxyphenoxy) - pentane, 1,6 - bis(4 - carboxyphenoxy) - hexane, bis(4 - carboxyphenyl) - ether, bis(4 - carboxyphenyl) - thioether, bis(4 - carboxyphenyl) - sulfone, 4-carboxyphenoxy - 4' - carboxyphenyl - methane, 4,4' - dicarboxybenezophenone and the like.

One class of acid dihalides of alicyclic dicarboxylic acids (II–2) having the above general Formula 1–2 and preferably useful for the preparation of the poly(hydroxyethers) based polyesters of this invention are those of the Formula 1–2–a:

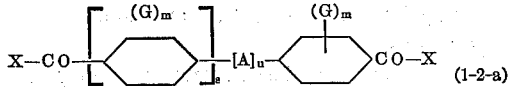

(1-2-a)

wherein A, X, G and m have the same significance defined heretofore;

is a member selected from the group comprising of 1,4-cyclohexylene groups and the groups which are derived by substituting them with alkyl groups is preferably trans-1,4-cyclohexylene group; u ranges zero to one, s ranges zero to one, when s is zero, however, u must be zero, and the examples of the acid dihalides of alicyclic dicarboxylic acids (II–2–a) having the Formula 1–2–a include, but are not limited to, trans-hexahydroterephthaloyl chloride, hexahydroiso - phthaloyl chloride, hexahydrophthaoyl chloride, hexahydroiso-phthaloyl chloride trans-trans-4,4' - dodecahydrodibenzoyl chloride, cis-trans - 4,4'-dodecahydrodibenzoyl chloride, cis-cis - 4,4' - dodecahydrodibenzoyl chloride, 3,3' - dodecahydrodibenzoyl chloride, 2,2' - dodecahydrodibenzoyl chloride, the acid dibromides corresponding to them and the like.

Examples of other acid dihalides of alicyclic dicarboxylic acids (II–2) having the general Formula 1–2 include, but are not limited to, the acid dichlorides and the acid dibromides of the following acids: 3,3'-dodecahydrodibenzoic acid, 2,2'-dodecahydrodibenzoic acid, trans-cyclopropane-1,2-dicarboxylic acid, trans-3-methyl-cyclopropane-1,2-dicarboxylic acid, trans-cyclobutane-1,3 - dicarboxylic acid, cyclopentane-1,3-dicarboxylic acid, cis-cyclopropane-1,2-dicarboxylic acid, cyclobutane-1,2-dicarboxylic acid, cyclopentane-1,2-dicarboxylic acid and the like.

One class of the acid dihalides of dicarboxylic acid (II–3) having the general Formula (1–3) which are useful for preparing the poly(hydroxyethers) based polyesters of this invention are those of the following Formula (1–3–a):

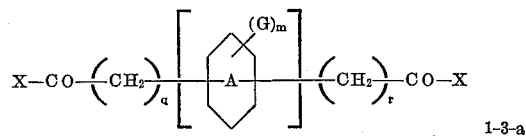

1-3-a wherein

is a member selected from the group comprising of p-phenylene group, m-phenylene group, 1,4-cyclohexylene group, 1,3-cyclohexylene group, and the groups which are derived by substituting them with alkyl groups; G is a substituted halogen atom; m ranges zero to 4; q and r range one to 3; X has the same significance defined heretofore; and the examples of the acid dihalides of dicarboxylic acids (II–3–a) having the general Formula (1–3–a) include, but are not limited to, the following: p-phenylene diacetyl chloride and p-phenylene dipropionyl chloride, p-hexahydrophenylene diacetyl chloride, the acid dibromides corresponding to them and the like.

Another class of the acid dihalides (II–3) having the general Formula (1–3) which are useful for preparing the poly(hydroxyethers) based polyesters of this invention are those of the following Formula (1–3–b):

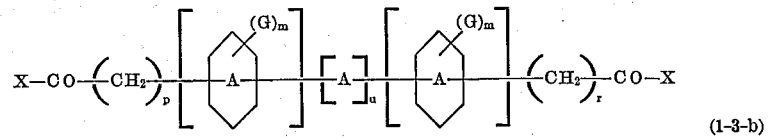

(1-3-b)

wherein

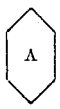

is a member selected from the group comprising of p-phenylene group, m-phenylene group, 1,4-cyclohexylene group and the groups derived by substituting them with alkyl groups; B, X, Y, $m$ and $u$ have the same significance defined heretofore; $q$ and $r$ range one to 3; and the examples of the acid dihalides (II-3-b) having the above Formula (1-3-b) include, are not limitied to, the following:

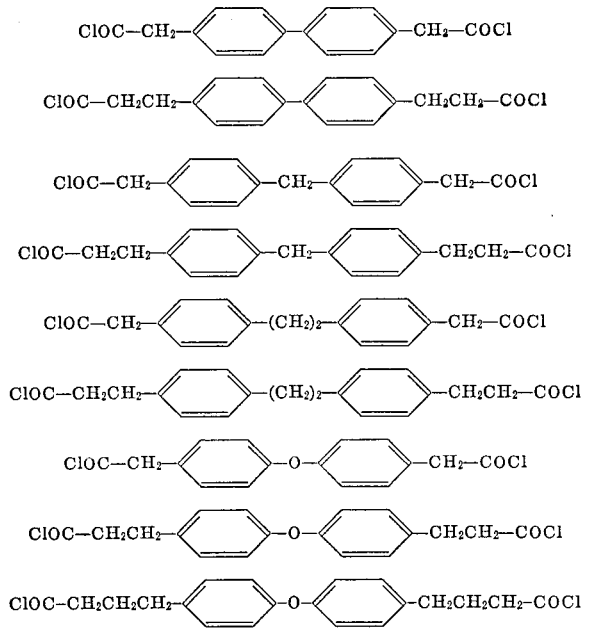

the acid dibromides corresponding to them and the like.

One class of the bishaloformates of dihydric phenols (II-4) having the general Formula (1-3) and being preferably useful for preparing the poly(hydroxyethers) based polyesters of this invention are those of the following Formula (1-4-a):

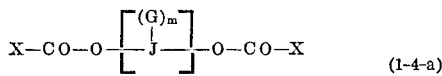

(1-4-a)

wherein J is a member selected from the group comprising of phenylene groups, (preferably p-phenylene group, m-phenylene group), naphthylene groups (preferably 1,5-naphthylene group, 2,6-naphthylene group), the groups which are derived by substituting them with alkyl groups; A, X, G, $m$ and $u$ have the same significance defined heretofore. And the examples of the bishaloformates of dihydric phenols (II-4-b) having the Formula (2-4-b) include, but are not limited to the bischloroformates and bisbromoformates of the following dihydric phenols: resorcinol, hydroquinone, 1,5-dihydroxynaphthalene, 2,6-dihydroxynaphthalene, 2,7-dihydroxynaphthalene, and the like.

Another class of the bishaloformates of dihydric phenols (II-4) having the general Formula 1-4 and being preferably useful for the preparation of the poly(hydroxylethers) based polyesters of this invention are those of the following Formula (1-4-b):

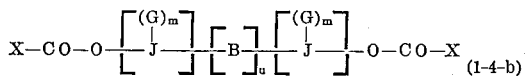

(1-4-b)

wherein J is a member selected from the group comprising of phenylene groups (preferably p-phenylene group, m-phenylene group), naphthylene groups (preferably 1,5-naphthylene group, 2,6-naphthylene group, 2,7-naphthylene group) and the groups which are derived by substituting them with alkyl groups; A, X, G, $m$ and $u$ have the same significance defined heretofore. And the examples of the bishaloformates of dihydric phenols (II-4-b) having the above Formula 2-4-b include, but are not limited to, the bischloroformates and bisbromoformates of the following dihydric phenols:

bis-(hydroxyphenyl)-alkanes such as
2,2-bis(p-hydroxyphenyl)-propane,
bis-(2-hydroxyphenyl)-methane,
bis-(4-hydroxyphenyl)-methane,
bis-(4-hydroxy-2,6-dimethyl-3-methoxyphenyl)-methane,
1,1-bis(4-hydroxyphenyl)-ethane,
1,2-bis-(4-hydroxyphenyl)-ethane,
1,1-bis-(4-hydroxy-2-chlorophenyl)-ethane,
1,1-bis-(3,5-dimethyl-d-hydroxyphenyl)-ethane,
1,3-bis-(3-methyl-4-hydroxyphenyl)-propane,
2,2-bis-(3,5-dichloro-4-hydroxyphenyl)-propane,
2,2-bis-(3-phenyl-4-hydroxyphenyl)-propane,
2,2-bis-(3-isopropyl-4-hydroxyphenyl)-propane,
2,2-bis-(2-isopropyl-4-hydroxyphenyl)-propane,
2,2-bis-(4-hydroxynaphthyl)-propane,
2,2-bis-(4-hydroxyphenyl)-pentane,
3,3-bis-(4-hydroxyphenyl)-pentane,
2,2-bis-(4-hydroxyphenyl)-heptane,
bis-(4-hydroxyphenyl)-phenylmethane,
bis-(4-hydroxyphenyl)-cyclo-hexylmethane,
1,2-bis-(4-hydroxyphenyl)-1,2-bis-(phenyl)-propane,
2,2-bis-(4-hydroxyphenyl)-1-phenylpropane and the like;
dihydroxy biphenyls such as
4,4'-dihydroxybiphenyl, and the like;

di(hydroxyphenyl)sulfones such as
bis(4-hydroxyphenyl)-sulfone,
5'-chloro-4,4'-dihydroxydiphenyl sulfone,
3'-chloro-4,4'-dihydroxy diphenyl sulfone
and the like;

di(hydroxyphenyl ethers such as
bis-(4-hydroxyphenyl)-ether,
the 4,3'-dihydroxy-diphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynapthyl)-ether,
bis-(4-hydroxy-3-chloro-naphthyl)-ether,
4,4'-dihydroxy-2,6-dimethoxydiphenyl ether,
4,4'-dihydroxy-2,5-diethoxydiphenyl ether, and the like;
also suitable are 1,1-bis-(4-hydroxyphenyl)-2-phenylethane,
2,4-bis(p-hydroxyphenyl)-4-methylpentane
and the like.

Examples of other bishaloformates of dihydric phenols (II-4-b) having the general Formula 2-4-b include, but are not limited to, the bischloroformates and bisbromoformates of the following dihydric phenols:

2,4'-dihydroxydiphenylmethane,
2,2'-dihydroxybiphenyl,
2,4'-dihydroxybiphenyl,
2,4'-dihydroxydiphenylsulfone,
5'-chloro-2,4'-dihydroxydiphenylsulfone,
4,2'-dihydroxydiphenylether,
2,2'-dihydroxy-diphenylether,
2,3'-dihydroxy-diphenylether
and the like.

One class of the bishaloformates of dihydric alcohols (II-5) having the general Formula 1-5 and being useful for preparing the poly(hydroxyethers) based polyesters of this invention are those of the Formula 1-5-a:

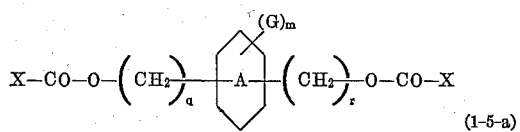

(1-5-a)

wherein

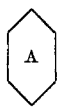

is a member selected from the group comprising a p-phenylene group, m-phenylene group, 1,4-cyclohexylene group, 1,3-cyclohexylene group and the groups which are derived by substituting them with alkyl groups; X has the same significance defined heretofore; G is a substituted halogen atom; $m$ ranges zero to 4; $q$ and $r$ range from zero to 3, when

shows an aromatic ring, however, $q$ and $r$ must be greater than one, and the examples of the bishaloformates of dihydric alcohols (II-5-a) having the Formula 1-5-a include, but are not limited to, the bischloroformates and bisbromoformates of the following dihydric alcohols:

1,3-dihydroxycyclohexane, 1,4-dihydroxycyclohexane, 1,4-bis(hydroxymethyl)cyclohexane, p-xylene-glycol, m-xyleneglycol, o-xyleneglycol, 1,4-bis(hydroxyethyl)-benzene, 1,4-bis(3-hydroxypropyl)-benzene, 1,4-bis(2-hydroxyethyl)-benzene, 1,4-bis(2-hydroxypropyl)-benzene, 1,4-bis(2-hydroxyiso-propyl)-benzene, 1,3-bis(2-hydroxyethyl)-benzene, 1,3-bis(2-hydroxypropyl)-benzene, 1,3-bis(2-hydroxyiso-propyl)-benzene and the like.

Another class of the bishaloformate of dihydric alcohols (II-5) having the general Formula 1-5 and being useful for preparing the poly(hydroxylethers based polyesters of this invention are those having the following Formula 1-5-b:

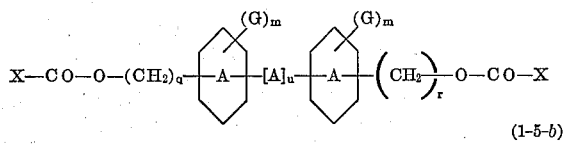

(1-5-b)

wherein

is a member selected from the group comprising of p-phenylene group, m-phenylene group, 1,4-cyclohexylene group, 1,3-cyclohexylene group and the groups which are derived by substituting them with alkyl groups; $q$ and $r$ range zero to 3; A, X, G, $m$ and $u$ have the same significance defined theretofore; in the case that

represents an aromatic ring, however, $q$ and $r$ may not be zero. And examples of the bishaloformate of dihydric alcohols (II-5-b) having the Formula 1-5-b include, but are not be limted to, the bischloroformates and bisbromoformates of the following dihydric alcohols:

2,2-bis(4-hydroxycyclohexyl)-propane,
(4,4'-dihydroxy-dicyclohexyl)-methane,
1,1-bis(4-hydroxycyclohexyl)-ethane,
1,1-bis(4-hydroxycyclohexyl)-propane,
1,1-bis(4-hydroxycyclohexyl)-butane,
1,1-bis(4-hydroxycyclohexyl)-pentane,
2,2-bis(4-hydroxycyclohexyl)-butane,
2,2-bis(4-hydroxycyclohexyl)-pentane,
2,2-bis(4-hydroxy-3-methyl-cyclohexyl)-propane,
2,2-bis(4-hydroxy-2-methylcyclohexyl)-propane,
4,4'-dihydroxymethyl-bicyclohexane,
1,2-bis(4-hydroxymethyl-cyclohexyl)-ethane,
2,2-bis(4-hydroxymethylcyclohexyl)-propane,
2,3-bis(4-hydroxymethyl-cyclohexyl)-butane,
2,3-dimethyl-2,3-bis(4-hydroxymethylcyclohexyl)-butane,
2,2-bis(4-hydroxymethylphenyl)-propane,
2,2-bis(4-β-hydroxyethylphenyl)-propane,
2,2-bis(4-hydroxypropylphenyl)-propane,
1,1-bis(4-β-hydroxyethylphenyl)-butane,
2,2-bis(4β-hydroxyethylphenyl)-butane,
2,2-bis-(3-methyl-4-β-hydroxyethylphenyl)-propane,
4,4'-di(β-hydroxyethyl)-diphenylether,
4,4'-di(β-hydroxyethyl)-diphenylthioether,
4,4'-(β-hydroxyethyl)-benzophenone,
bis(4-β-hydroxy-ethyl-phenyl)-sulfone,
bis(3-β-hydroxyethyl-phenyl) sulfone
and the like.

Another class of the bishaloformates of dihydric alcols (II-5) having the general Formula 1-5 include, but are not limited to, the bischloroformates and bisbromoformates of the following dihydric alcohols;

1,3-dihydroxycyclobutane,
1,3-dihydroxy-2,2,4,4'-tetramethylcyclobutane,
2,6-dihydroxy-decahydronaphthalene,
2,7-dihydroxy-decahydronaphthalene,
1,5-dihydroxy-decahydronaphathlene,
2,6-bis(hydroxymethyl)-decahydronaphthalene,
2,7-bis(hydroxymethyl)-decahydronaphthalene,
1,5-bis(hydroxymethyl)-decahydronaphthalene,
1,4-bis(hydroxymethyl)-decahydronaphthalene,
1,4-bis-(hydroxymethyl)-bicyclo(2,2,2) octane,
dimethyloltricyclodecane,
and the like.

The strongly basic compounds (III) which are useful for preparing the poly(hydroxyethers) based polyesters include alkali metal hydroxides, e.g. sodium hydroxide, potassium hydroxide mixture thereof, tertiary amines represnted by the general Formula 5-1 and quaternary ammonium salts represented by the general Formula 5-2 disclosed hereinunder.

The basic catalysts (IV) which are useful for the preparation of the poly(hydroxyethers) based polyesters of this invention include tertiary amines (IV-1), quaternary ammonium salts (IV-2), and basic compounds containing phosphor, arsenic, antimony bismuth atom. And tertiary amines (IV-1) and quaternary ammonium salts (IV-2) are preferable for the purpose of this invention.

The examples of the tertiary amines (IV-1) are those of the following Formula 5-1:

(5-1)

wherein $R_1$, $R_2$ and $R_3$ are organic residues such as alkyl, hydroxyalkyl, aryl, aralkyl, alkaryl groups and the like, and preferably those of which have up to 8 carbon atoms, and each of $R_1$, $R_2$ and $R_3$ may be the same or different, however $R_1$, $R_2$ and $R_3$ may be joined together with a nitrogen atom, and $R_1$ and $R_2$ may be joined together by carbon-carbon bond or joined together with oxygen or tertiary nitrogen atom. Preferred among them include, but are not limited to, trialkyl amines, e.g. trimethyl amine, triethyl amine, tri-n-propyl amine, tri-n-butyl amine and the like, trihydroxyalkyl amines, e.g. triethanol amine, tri-isopropanol amine and the like, dialkylaryl amine, e.g. dimethyl phenyl amine and the like, dialkyl-alkaryl amines, e.g. dimethyl-benzyl amine and the like, dialkyl-cycloalkyl amines, e.g. dimethyl-cyclohexyl amine and the like, N-alkyl-piperadines, e.g. N-methyl piperadine and the like, N-alkyl morpholines, e.g. N-methyl-morpholines.

The examples of the quaternary ammonium salts (IV-2) are those of the following Formula 5-2.

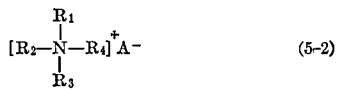

wherein $R_1$, $R_2$ and $R_3$ are organic residues such as alkyl, hydroxyalkyl aryl, alkaryl, aralkyl and the like, preferably those of which having up to 8 carbon atoms, and each of $R_1$, $R_2$ and $R_3$ may be the same or different, however $R_1$ and $R_2$ may be joined with carbon-carbon bond; $R_4$ is an alkyl group having up to 4 carbon atoms; $A^-$ is a monovalent anion.

And the examples of monovalent anion represented by $A^-$, there may be mentioned halogen ion (for example, chloride ion, bromide ion and iodide ion), alkyl sulfate ion (for example methyl sulfate ion and ethyl sulfate ion), aromatic sulfonate ion (for example p-toluene sulfonate ion and benzene sulfonate ion) and hydroxyl ion, however preferable monovalent ion is halogen ion, methyl sulfate ion or hydroxyl ion.

As examples of particularly preferable quaternary ammonium salts (IV-2), there may be mentioned for example, tetramethylammonium chloride, tetramethylammonium bromide, tetraethylammonium iodide, tetramethyl-ammonium hydroxide, tetramethylamonium methyl sulfate trimethyl-benzyl-ammonium chloride and trimethyl-benzyl-ammonium hydroxide.

As examples of preferable quaternary ammonium salt in which $R_1$, and $R_2$ are joined together as a cyclic chain, there may be mentioned for example N-dimethyl-piperidium chloride.

The examples of the tertiary phosphine, tertiary arsine, tertiary antimony compound and tertiary bismuth compound which are included in the basic compound (IV-3) are represented by general Formula 5-3:

wherein M is phosphor, arsenic, antimony or bismuth, R′, R″ and R‴ are selected from the group consisting of alkyl, aryl, alkaryl or aralkyl group having up to 8 carbon atoms, and each of R′, R″ and R‴ may be the same or different. And in the case that T is phosphor, R′, R″ and R‴ may be joined together as a cyclic chain interrupted by phosphor atom.

Preferred among them include, but are not limited to, the following: trimethylphosphine, triethylphosphine, tributylphosphine, triphenylphosphine, tribenzylphosphine, triethylenedihosphine, tributylarsine, tribenzylarsine, tributylantimony, triphenylantimony, tributylbismuth, and triphenylbismuth.

The process of this invention, for preparing the poly (hydroxyethers) based polyesters, can be conducted by admixing the poly(hydroxyethers) prepolymers (I) and from about 0.985 to about 1.05 moles, preferably one mole, of the dibasic acid halides (II), per mole of the poly(hydroxyethers) prepolymers (I), together with catalytic amount of the basic catalysts (IV) in the presence of one to more than one equivalent of the strongly basic compounds (III), per equavalent of the phenolic hydroxy group of the poly(hpdroxyethers) prepolymer (I). And the reaction of this invention can be carried in the presence of an inert diluent which is a solvent for one or more of the starting materials, and it is preferred to carry the reaction by admixing the soluion which contains the poly(hydroxyethers) prepolymer (I) and the solution which contains the dibasic acid halides (II) by vigorous stirring. The diluents which can be used in the method of this invention include, among others the following:

(1) The solvents or dispersants for the poly(hydroxyethers) prepolymers (I) such as water, alcohols, e.g. methanol, ethanol, isopropanol, n-butanol, n-hexanol, tert.-butanol, benzyl-alcohol, cyclohexanol, ethylene glycol, and the like other hydroxylated compounds, e.g. ethylene glycol monomethyl ether, ethylene glycol monoethyl ether and the like, aromatic hydrocarbons, e.g. benzene, xylene and the like, halogenated aromatic hydrocarbons, e.g. chlorobenzene and the like, halogenated aliphatic hydrocarbons, e.g. dichloromethane, chloroform, 1,2-dichloroethane and the like, aliphatic ketones, e.g. acetone, methyl ethyl ketone, diethyl ketone and the like, ethers, e.g. diethyl ether, dioxane, tetrahydrofuran and the like, other polar solvents, e.g. dimethyl-formamide, dimethylphosphoramide and the like, and mixture thereof, and (2) The solvents for the dibasic acid halides such as halogenated aliphatic hydrocarbons as disclosed above, halogenated aromatic hydrocarbons as disclosed above, nitrated aromatic hydrocarbons such as nitro benzene, nitrotoluene and the like, and mixture thereof, and the like.

The reaction temperature for preparing the poly(hydroxyethers) based polyesters of this invention ranges from about 0° to about 50° C., preferably. In the case that an acid dihalide or dicarboxylic acid is used as the dibasic acid halide (II), the reaction temperature is most preferably less than 35° C., in the case that a bis-haloformate of dihydric compound is used as a dibasic acid halide (II), however, the reaction temperature is preferably less than 40° C., most preferably less than 25° C.

Careful control of the ratio of the poly(hydroxyether) prepolymer (I) to the dibasic acid halides (II) in the reaction mixture is of great importance in order to prepare the product having the desired properties. Conducting the reaction by using the reaction mixture which contains more than 1.1 moles of the dibasic acid halides (II), per mole of the poly(hydroxyethers) prepolymers (I), the terminating reaction occurs, and the product having low molecular weight, poor chemical resistance and poor impact strength is obtained inevitably. And conducting the reaction by using the reaction mixture which contains less than 0.9 mole of the dibasic acid halides (II) per mole of the poly(hydroxyethers) prepolymer (I), the terminating reaction occurs, and the product having desired properties cannot be prepared.

To one's surprise, in the range of said conditions in this invention, an extremely high molecular weight linear polymer is produced on evidence of the tests such as intrinsic viscosity and melt index, and the reaction between dibasic acid halide (II) and alcoholic hydroxyl groups is utterly eliminated, and only reaction between dibasic acid halide (II) and the terminal phenolic hydroxyl groups advances selectively, and high molecular weight linear polyester based on poly(hydroxyether) is produced by connecting poly(hydroxyether) prepolymer mutually.

The poly(hydroxyether) based polyester of this invention has sufficiently high molecular weight and substantially linear structure, and has higher distortion temperature and stronger notched Izod impact strength than those of well-known poly(hydroxyether) resin, and is suited for coating, laminating, film making and molding, and gives coating, lamination or film having lower gas permeability.

The invention will be better understood from the following examples. These examples are given for purposes of illustration only and the invention is not to be considered as limited by the reactants and conditions described in the examples.

EXAMPLE 1

(a) Preparation of poly(hydroxyether) prepolymer composition $A_1$

The reaction vessel fitted with a sealed stirrer, a thermometer and reflux condenser, was charged with the following Material A. The reaction was carried out by stirring the Material A at 30° C. for 30 hours. During this reaction, in every occasion that the mixture became too viscous to stir, monochlorobenzene was added to the mixture, until total weight of monochlorobenzene became to ten parts.

Thereafter, the resulting mixture was heated at a temperature of 72–75° C., for 6 hours and cooled to room temperature.

| Material A: | Parts by wt. |
|---|---|
| 2,2-bis(4-hydroxyphenyl)propane (1) | 22.83 |
| Epichlorohydrin (0.95) | 8.80 |
| Tertiary butyl alcohol | 23.0 |
| Sodium hydroxide (1.05) | 4.2 |
| Water | 16.1 |

The numbers in parentheses ( ) indicate mole-ratio. This applies correspondingly in the following cases.

(b) Preparation of poly(hydroxyether) based polyester

The reaction vessel fitted with a stirrer and a thermometer, was charged with the following Material B while stirring.

Then the following Material C was added to the reaction vessel under vigorous agitation. The reaction was carried out by stirring the mixture of Material B and Material C for 30 minutes, thereafter hydrochloric acid was added, and the reaction was stopped. During the reaction, the mixture was maintained at a temperature of 28–29° C.

The resulting mixture was washed five times with water, and the product was precipitated by adding methanol, and separated from the mixture, and dried under vacuum.

The properties of product are shown hereinafter.

| Material B: | Parts by wt. |
|---|---|
| Chloroform | 400 |
| Water | 20 |
| Dimethylbenzyl amine | 0.5 |
| Poly(hydroxyether)prepolymer composition $A_1$ (0.05) whole volume by wt. | |

| Material C: | Parts by wt. |
|---|---|
| Iso-phthaloyl dichloride (0.05) | 1.02 |
| Chloroform | 200 |
| Properties of product: | |
| Melt index | 0.42 |
| Heat distortion temperature (66 p.s.i.)° C. | 98 |
| Impact strength, notched Izod (ft. lb./in., notch) | 11.5 |

EXAMPLE 2

(a) Preparation of poly(hydroxyether) prepolymer composition $B_1$

The reaction was carried out by the same method as that employed in the Example 1, except using the following Material A.

Thereafter, the resulting mixture was washed five times perature of 60° C., for 6 hours, and cooled to room temperature.

| Material A: | Parts by wt. |
|---|---|
| 2,2-bis(4-hydroxyphenyl) propane (1) | 22.83 |
| Epichlorohydrin (0.9) | 8.33 |
| Tertiary butylalcohol | 23.0 |
| Sodium hydroxide (1) | 4.0 |
| Water | 16.8 |

(b) Preparation of poly(hydroxyether) based polyester.

The reaction of poly(hydroxyether) prepolymer $B_1$ and terephthaloyl dichloride was carried out by the same method as that employed in the Example 1, except using the following Material B. and Material C.

Therefore, the resulting mixture was washed five times with water, and the product was precipitated by adding methanol, and separated from the mixture, and dried under vacuum.

The properties of product are shown hereinafter.

| Material B: | Parts by wt. |
|---|---|
| Chloroform | 400 |
| Sodium hydroxide (0.1) | 0.4 |
| Water | 20 |
| Trimethylbenzylammonium chloride | 0.5 |
| Poly(hydroxyether) prepolymer composition $B_1$ (0.1) whole volume by wt. | |

| Material C: | Parts by wt. |
|---|---|
| Terephthaloyl dichloride (0.1) | 2.03 |
| Chloroform | 200 |
| Properties of product: | |
| Melt index | 1.6 |
| Heat distortion temperature (66 p.s.i.)° C. | 108 |
| Impact strength, notched Izod (ft. lb./in., notch) | 17.1 |

EXAMPLE 3

(a) Preparation of poly(hydroxyether) prepolymer composition $C_1$

The reaction was carried out by the same method as that employed in the Example 1, except using the following Material A.

Thereafter, the resulting mixture was heated at a temperature of 50° C., for 6 hours, and cooled to room temperature.

| Material A: | Parts by wt. |
|---|---|
| 2,2-bis(4-hydroxyphenyl) propane (1) | 22.83 |
| Epichlohydrin (0.85) | 7.87 |
| Tertiary butylalcohol | 23.0 |
| Sodium hydroxide (0.95) | 3.8 |
| Water | 16.8 |

(b) Preparation of poly(hydroxyether) based polyester

The reaction of poly(hydroxyether) prepolymer $C_1$ and iso-phthaloyl dichloride was carried out by the same method as that employed in the Example 1, except using the following Material B and Material C.

Thereafter, the resulting mixture was washed five times with water, and the product was precipitated by adding methanol, and separated from the mixture, and dried under vacuum.

The properties of product are shown hereinafter.

| Material B: | Parts by wt. |
|---|---|
| Chloroform | 400 |
| Sodium hydroxide (0.2) | 0.8 |
| Water | 20 |
| Trimethylbenzylammonium chloride | 0.7 |
| Poly(hydroxyether) prepolymer composition $C_1$ (0.15) whole volume by wt. | |

| Material C: | Parts by wt. |
|---|---|
| Iso-phthaloyl dichoride (0.15) | 3.05 |
| Choroform | 200 |
| Properties of product: | |
| Melt index | 1.1 |
| Heat distortion temperature (66 p.s.i.)° C. | 104 |
| Impact strength, notched Izod (ft. lb./in., notch) | 12.9 |

EXAMPLE 4

(a) Preparation of poly(hydroxyether) prepolymer composition $D_1$

The reaction was carried out by the same method as that employed in the Example 1, except using the following Material A.

Thereafter, the resulting mixture was heated at a temperature of 40° C., for 10 hours, and cooled to room temperature.

| Material A: | Parts by wt. |
|---|---|
| 2,2-bis(4-hydroxyphenyl) propane (1) | 22.83 |
| Epichlorohydrin (0.8) | 7.41 |
| Tertiary butylalcohol | 23.0 |
| Sodium hydroxide (0.9) | 3.6 |
| Water | 17 |

(b) Preparation of poly(hydroxyether) based polyester

The reaction of poly(hydroxyether) prepolymer $D_1$ and terephthaloyl dichloride was carried out by the same method as that employed in the Example 1, except using the following Material B and Material C.

Thereafter, the resulting mixture was washed five times with water, and the product was precipitated by adding methanol, and separated from the mixture, and dried under vacuum.

The properties of product are shown hereinafter.

| Material B: | Parts by wt. |
|---|---|
| Chloroform | 400 |
| Sodium hydroxide (0.25) | 1 |
| Water | 20 |
| Tetramethyl ammonium chloride | 0.7 |
| Poly(hydroxyether) prepolymer composition $D_1$ (0.2) whole volume by wt. | |

| Material C: | Parts by wt. |
|---|---|
| Terephthaloyl dichloride (0.2) | 4.05 |
| Chloroform | 200 |
| Properties of product: | |
| Melt index | 0.85 |
| Heat distortion temperature (66 p.s.i.) ° C. | 109 |
| Impact strength, notched Izod (ft. lb./in. notch) | 15.1 |

EXAMPLE 5

(a) Preparation of poly(hydroxyether) prepolymer composition $E_1$

The reaction was carried out by the same method as that employed in the Example 1, except using the following Material A.

Thereafter, the resulting mixture was heated at a temperature of 50° C., for 6 hours, and cooled to room temperature.

| Material A: | Parts by wt. |
|---|---|
| 4,4'-dihydroxydiphenyl-ether (1) | 20.2 |
| Epichlorohydrin (0.85) | 7.87 |
| Tertiary butylalcohol | 23.0 |
| Sodium hydroxide (0.95) | 3.8 |
| Water | 17.4 |

(b) Preparation of poly(hydroxyether) based polyester

The reaction of poly(hydroxyether) prepolymer $E_1$ and iso-phthaloyl dichloride was carried out by the same method as that employed in the Example 1, except using the following Material B and Material C.

Thereafter, the resulting mixture was washed five times with water, and the product was precipitated by adding methanol, and separated from the mixture, and dried under vacuum.

The properties of product are shown hereinafter.

| Material B: | Parts by wt. |
|---|---|
| Chloroform | 400 |
| Sodium hydroxide (0.2) | 0.8 |
| Water | 20 |
| Trimethylbenzylammonium chloride | 0.7 |
| Poly(hydroxyether) prepolymer composition $E_1$ (0.15) whole volume by wt. | |

| Material C: | Parts by wt. |
|---|---|
| Iso-phthaloyl dichloride (0.15) | 3.05 |
| Chloroform | 200 |
| Properties of product: | |
| Melt index | 0.21 |
| Heat distortion temperature (66 p.s.i.) ° C. | 155 |
| Impact strength, notched Izod (ft. lb./in., notch) | 11.6 |

EXAMPLE 6

The poly(hydroxyether) prepolymer $A_1$, $B_1$, $C_1$ and $D_1$ that were shown in the Examples 1, 2, 3 and 4 respectively, were washed with dilute hydrochloric acid and washed six times with water to remove sodium hydroxide and sodium chloride.

Then, 400 parts of chloroform, 20 parts of water, 0.5 part trimethylbenzyl ammonium chloride and the same parts of sodium hydroxide as indicated in the Table I, were added to poly(hydroxyether) prepolymer and dissolved by agitation.

Chloroform solution of terephthaloyl dichloride was added to the mixture and stirred for 30 minutes.

Thereafter the resulting mixture was washed five times with water, and the product was purified by the same manner as that employed in the Example 1.

The results were shown in the Table I.

TABLE I.—THE RELATIONS BETWEEN REACTION CONDITIONS OF POLY (HYDROXYETHER) PREPOLYMER AND ACID CHLORIDE, AND PROPERTIES OF PRODUCED POLYETHER-ESTER RESINS

| Kind of poly(hydroxyether) prepolymer | Added volume of— | | | | Properties of produced resins | | | |
|---|---|---|---|---|---|---|---|---|
| | Sodium hydroxide | | Terephthaloyl dichloride | | Reaction temperature (°C.) | Melt index at 220° C. 44 p.s.i. (g./10 min.) | Heat distortion temperature at 66 p.s.i. (° C.) | Impact strength, notched Izod (ft. lb./in. notch) |
| | Part | Mole | Part | Mole | | | | |
| 1 $A_1$ | 0.12 | 0.03 | 1.02 | 0.0050 | 25–30 | 0.34 | 101 | 12.1 |
| 2 $A_1$ | 0.12 | 0.03 | 1.12 | 0.0055 | 25–30 | 5.60 | 82 | 3.5 |
| 3 $B_1$ | 0.12 | 0.03 | 2.03 | 0.010 | 25–30 | 1.45 | 107 | 15.5 |
| 4 $B_1$ | 0 | 0 | 2.03 | 0.010 | 25–30 | <0.1 | This product did not substantially show plasticity | |
| 5 $C_1$ | 0.12 | 0.03 | 3.05 | 0.015 | 25–30 | 0.80 | 110 | 14.7 |
| 6 $C_1$ | 0.12 | 0.03 | 3.05 | 0.015 | 55–60 | <0.1 | This product did not substantially show plasticity | |
| 7 $D_1$ | 0.16 | 0.04 | 4.05 | 0.020 | 25–30 | 0.77 | 110 | 15.3 |
| 8 $D_1$ | 0.16 | 0.04 | 3.66 | 0.018 | 25–30 | 14.50 | 69 | 2.5 |

1, 3, 5 and 7 in the Table I are the examples according to the invention, and 2, 4, 6 and 8 are the examples for comparison.

EXAMPLE 7

(a) Preparation of poly(hydroxyether) prepolymer composition

| | Gr. |
|---|---|
| Bisphenol A (0.10 mole) | 22.83 |
| Epichlorohydrin (0.075 mole) | 6.95 |
| Sodium hydroxide (0.0825 mole) | 3.5 |
| (Note: purity of sodium hydroxide is 93%) | |
| Water | 12.5 |
| Tertiarybutylalcohol | 23.0 |

The above reaction mixture was stirred at a temperature of 35° C. for 30 hours and thereafter heated at a temperature of 74–75° C. for 7 hours stirring.

When the reaction was completed, 1.83 gr. of sodium hydroxide (0.0425 mole) and 6.5 gr. of water was added to the resulting mixture.

(b) Preparation of poly(hydroxyether) based polyester

Solution A.—Poly(hydroxyether) prepolymer was dissolved in 400 gr. of chloroform, 20 gr. of water and 0.7 gr. of trimethyl-benzylammonium chloride as a catalyst.

Solution B.—6.33 gr. of the acid chloride which were indicated in the Table II, was dissolved in 200 gr. of chloroform.

Solutions A and B were mixed and the mixture was stirred vigorously.

The reaction of poly(hydroxyether) prepolymer and acid chloride was carried out by stirring at a temperature of 25° C. for 30 minutes.

Thereafter the resulting mixture was washed five times with water, and the product was purified by the same manner as that employed in the Example 1.

The results were shown in the Table II.

(b) Preparation of poly(hydroxyether) based polyester

The reaction vessel fitted with a stirrer and a thermometer, was charged with the following Material B while stirring.

Then the following Material C was added to the reaction vessel under vigorous agitation. The reaction was carried out by stirring the mixture of Material B and Material C for 30 minutes, thereafter hydrochloric acid was added, and the reaction was stopped. During the reaction, the mixture was maintained at a temperature of 28–29° C.

The resulting mixture was washed five times with water, and the product was precipitated by adding methanol, and separated from the mixture, and dried under vacuum.

The properties of product are shown hereinafter.

| Material B: | Parts by wt. |
|---|---|
| Chloroform | 400 |
| Water | 20 |
| Dimethylbenzyl amine | 0.5 |
| Poly(hydroxyether) prepolymer composition $A_2$ (0.5) whole volume by wt. | |

| Material C: | Parts by wt. |
|---|---|
| ClOC—⟨⟩—⟨⟩—COCl (0.05) | 1.4 |
| Chloroform | 300 |

Properties of product:
- Heat distortion temperature (66 p.s.i) ° C. — 110
- Impact strength, notched Izod (ft. lb./in. notch) — 12.8

TABLE II

| | | Properties of polyether ester resin | | |
|---|---|---|---|---|
| No. | Acid chloride | Melt index | Heat distortion temp. (° C.) | Impact strength, notched Izod (ft. lb./in. notch) |
| 7-1 | 1,5-naphthoyl dichloride | 0.75 | | 12.2 |
| 7-2 | 2,6-naphthoyl dichloride | 0.73 | 111 | 11.9 |
| 7-3 | Mixture of 1,5- and 2,6-naphthoyl dichloride. | 0.88 | 307 | 13.5 |

EXAMPLE 8

(a) Preparation of poly(hydroxyether) prepolymer composition $A_2$

The reaction vessel fitted with a sealed stirrer, a thermometer and reflux condenser, was charged with the following Material A. The reaction was carried out by stirring the Material A as 30° C. for 30 hours. During this reaction, in every occasion that the mixture became too viscous to stir, monochlorobenzene was added to the mixture, until total weight of monochlorobenzene became to ten parts.

Thereafter, the resulting mixture was heated at a temperature of 72–75° C., for 6 hours and cooled to room temperature.

| Material A: | Parts by wt. |
|---|---|
| 2,2-bis(4-hydroxyphenyl) propane (1) | 22.83 |
| Epichlorohydrin (0.95) | 8.80 |
| Tertiary butyl alcohol | 23.0 |
| Sodium hydroxide (1.05) | 4.2 |
| Water | 16.1 |

The numbers in ( ) indicate mole-ratio. This applies correspondingly in the following cases.

EXAMPLE 9

(a) Preparation of poly(hydroxyether) prepolymer composition $B_2$

The reaction was carried out by the same method as that employed in the Example 8, except using the following Material A.

Thereafter, the resulting mixture was heated at a temperature of 60° C. for 6 hours, and cooled to room temperature.

| Material A: | Parts by wt. |
|---|---|
| 2,2-bis(4-hydroxyphenyl) propane (1) | 22.83 |
| Epichlorohydrin (0.9) | 8.33 |
| Tertiary butylalcohol | 23.0 |
| Sodium hydroxide (1) | 4.0 |
| Water | 16.8 |

(b) Preparation of poly(hydroxyether) based polyester

The reaction of poly(hydroxyether) prepolymer $B_2$ and acid chloride was carried out by the same method as that employed in the Example 8 except using the following Material B and Material C.

Thereafter, the resulting mixture was washed five times with water, and the product was precipitated by adding methanol, and separated from the mixture, and dried under vacuum.

The properties of product are shown hereinafter.

Material B: Parts by wt.
Chloroform _____ 400
Sodium hydroxide (0.1) _____ 0.4
Water _____ 20
Trimethylbenzylammonium chloride ___ 0.5
Poly(hydroxyether) prepolymer composition $B_2$ (0.1) whole volume by wt.

Material C:

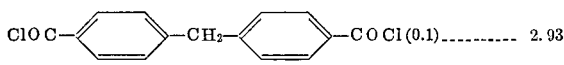 2.93

Chloroform _____ 300
Properties of product:
  Heat distortion temperature (66 p.s.i.) °C__ 111
  Impact strength, notched Izod (ft. lb./in., notch) _____ 16.9

EXAMPLE 10

(a) Preparation of poly(hydroxyether) prepolymer composition $C_2$

The reaction was carried out by the same method as that employed in the Example 8, except using the following Material A.

Thereafter, the resulting mixture was heated at a temperature of 50° C., for 6 hours, and cooled to room temperature.

Material A: Parts by wt.
2,2-bis(4-hydroxyphenyl) propane (1) _____ 22.83
Epichlorohydrin (0.85) _____ 7.87
Tertiary butylalcohol _____ 23.0
Sodium hydroxide (0.95) _____ 3.8
Water _____ 17.4

(b) Preparation of poly(hydroxyether) based polyester

The reaction of poly(hydroxyether) prepolymer $C_2$ and acid chloride was carried out by the same method as that employed in the Example 8 except using the following Material B and Material C.

Thereafter, the resulting mixture was washed five times with water, and the product was precipitated by adding methanol, and separated from the mixture, and dried under vacuum.

The properties of the product are shown hereinafter.

Material B: Parts by wt.
Chloroform _____ 400
Sodium hydroxide (0.2) _____ 0.8
Water _____ 20
Trimethylbenzylammonium chloride ___ 0.7
Poly(hydroxyether) prepolymer composition $C_2$ (0.15) whole volume by wt.

Material C: Parts by wt.

ClOC-⟨⟩-O-CH₂CH₂-O-⟨⟩-COCl (0.15) _____ 5.1
Chloroform _____ 350
Properties of product:
  Heat distortion temperature (66 p.s.i.) °C__ 111
  Impact strength, notched Izod (ft. lb./in., notch) _____ 18.3

EXAMPLE 11

(a) Preparation of poly(hydroxyether) prepolymer composition $D_2$

The reaction was carried out by the same method as that employed in the Example 8, except using the following Material A.

Thereafter, the resulting mixture was heated at a temperature of 40° C., for 10 hours, and cooled to room temperature.

Material A: Parts by wt.
2,2-bis(4-hydroxyphenyl) propane (1) _____ 22.83
Epichlorohydrin (0.8) _____ 7.41
Tertiary butylalcohol _____ 23.0
Sodium hydroxide (0.9) _____ 3.6
Water _____ 17

(b) Preparation of poly(hydroxyether) based polyester

The reaction of poly(hydroxyether) prepolymer $D_2$ and acid chloride was carried out by the same method as that employed in the Example 8, except using the following Material B and Material C.

Thereafter, the resulting mixture was washed five times with water, and the product was precipitated by adding methanol, and separated from the mixture, and dried under vacuum.

The properties of product is shown hereinafter.

Material B: Parts by wt.
Chloroform _____ 400
Sodium hydroxide (0.25) _____ 1
Water _____ 20
Tetramethyl ammonium chloride _____ 0.7
Poly(hydroxyether) prepolymer composition $D_2$ (0.2) whole volume by wt.

Material C: Parts by wt.

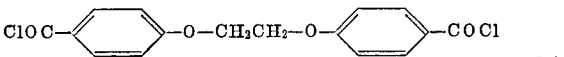 5.9

Chloroform _____ 300
Properties of product:
  Heat distortion temperature (66 p.s.i.) °C__ 107
  Impact strength, notched Izod (ft. lb./in., notch) _____ 17.9

EXAMPLE 12

(a) Preparation of poly(hydroxyether) prepolymer composition $E_2$

The reaction was carried out by the same method as that employed in the Example 8, except using the following Material A.

Thereafter, the resulting mixture was heated at a temperature of 50° C., for 6 hours, and cooled to room temperature.

Material A: Parts by wt.
4,4'-dihydroxydiphenyl-ether (1) _____ 20.2
Epichlorohydrin (0.85) _____ 7.87
Tertiary butylalcohol _____ 23.0
Sodium hydroxide (0.95) _____ 3.8
Water _____ 16.8

(b) Preparation of poly(hydroxyether) based polyester

The reaction of poly(hydroxyether) prepolymer $E_2$ and acid chloride was carried out by the same method as that employed in the Example 8, except using the following Material B and Material C.

Thereafter, the resulting mixture was washed five times with water, and the product was precipitated by adding methanol, and separated from the mixture, and dried under vacuum.

The properties of product are shown hereinafter.

Material B: Parts by wt.
Chloroform _____ 400
Sodium hydroxide (0.2) _____ 0.8
Water _____ 20
Trimethylbenzylammonium chloride ___ 0.7
Poly(hydroxyether) prepolymer composition $E_2$ (0.15) whole volume by wt.

Material C:

ClOC—⟨phenyl⟩—O—⟨phenyl⟩—COCl (0.15) ———— 4.43

Chloroform ———————————————————— 300
Properties of product:
    Heat distortion temperature (66 p.s.i.) °C. _ 134
    Impact strength, notched Izod (ft. lb./in., notch) ———————————————— 19.1

EXAMPLE 13

(a) Preparation of poly(hydroxyether) prepolymer composition $A_3$

The reaction vessel fitted with a sealed stirrer, a thermometer and reflux condenser, was charged with the following Material A. The reaction was carried out by stirring the Material A at 30° C. for 30 hours. During this reaction, in every occasion that the mixture became too viscous to stir, monochlorobenzene was added to the mixture, until total weight of monochlorobenzene became ten parts.

Thereafter, the resulting mixture was heated at a temperature of 72–75° C. for 6 hours and cooled to room temperature.

Material A:                      Parts by wt.
    2,2-bis(4-hydroxyphenyl)propane (0.1) ——— 22.83
    Epichlorohydrin (0.095) ————————— 8.80
    Tertiary butyl alcohol ————————————— 23.0
    Sodium hydroxide (1.05) ————————— 4.2
    Water ————————————————————— 16.1

The numbers in ( ) indicate mole-ratio. This applies correspondingly in to the following cases.

(b) Preparation of poly(hydroxyether) based polyester

The reaction vessel fitted with a stirrer and a thermometer, was charged with the following Material B while stirring.

Then the following Material C was added to the reaction vessel under vigorous agitation. The reaction was carried out by stirring the mixture of Material B and Material C for 30 minutes, thereafter hydro chloric acid was added, and the reaction was stopped. During the reaction, the mixture was maintained at a temperature of 0–5° C.

The resulting mixture was washed five times with water, and the product was precipitated by adding methanol, and separated from the mixture, and dried under vacuum.

The properties of product are shown hereinafter.

Material B:                      Parts by wt.
    Chloroform ———————————————————— 400
    Water ————————————————————— 20
    Dimethylbenzyl amine ————————————— 0.5

Poly(hydroxyether) prepolymer (composition $A_3$ (0.005) whole volume by wt.

Material C:
    Hexahydro-iso-phthaloyl dichloride (0.005) ____ 1.05
    Chloroform ———————————————————— 200
Properties of product:
    Melt index —————————————————— 1.12
    Heat distortion temperature (66 p.s.i.) °C. _ 95
    Impact strength, notched Izod (ft. lb./in., notch) ———————————————— 11.1

EXAMPLE 14

(a) Preparation of poly(hydroxyether) prepolymer composition $B_3$

The reaction was carried out by the same method as that employed in the Example 13, except using the following Material A.

Thereafter, the resulting mixture was heated at a temperature of 60° C., for 6 hours, and cooled to room temperature.

Material A:                      Parts by wt.
    2,2-bis(4-hydroxphenyl) propane (0.1) ——— 22.83
    Epichlorohydrin (0.09) ————————————— 8.33
    Tertiary butylalcohol ———————————— 23.0
    Sodium hydroxide (0.1) —————————— 4.0
    Water ————————————————————— 16.8

(b) Preparation of poly(hydroxyether) based polyester

The reaction of poly(hydroxyether) prepolymer $B_3$ and hexahydroterephthaloyl dichloride was carried out by the same method as that employed in the Example 13, except using the following Material B and Material C.

Thereafter, the resulting mixture was washed five times with water, and the product was precipitated by adding methanol, and separated from the mixture, and dried under vacuum.

The properties of product are shown hereinafter.

Material B:                      Parts by wt.
    Chloroform ———————————————————— 400
    Sodium hydroxide (0.01) —————————— 0.4
    Water ————————————————————— 20
    Trimethylbenzylammonium chloride ————— 0.5
    Poly(hydroxyether) prepolymer composition $B_3$ (0.01) whole volume by wt.
Material C:
    Hexahydroterephthaloyl dichloride (0.001) ____ 2.09
    Chloroform ———————————————————— 200
Properties of product:
    Melt index —————————————————— 1.9
    Heat distortion temperature (66 p.s.i.) °C. _ 101
    Impact strength, notched Izod (ft. lb./in., notch) ———————————————— 18.2

EXAMPLE 15

(a) Preparation of poly(hydroxyether) prepolymer composition $C_3$

The reaction was carried out by the same method as that employed in the Example 13, except using the following Material A.

Thereafter, the resulting mixture was heated at a temperature of 50° C., for 6 hours, and cooled to room temperature.

Material A:                      Parts by wt.
    2,2-bis(4-hydroxyphenyl) propane (0.1) ——— 22.83
    Epichlorohydrin (0.085) ———————————— 7.87
    Tertiary butylalcohol ———————————— 23.0
    Sodium hydroxide (0.095) —————————— 3.8
    Water ————————————————————— 17.4

(b) Preparation of poly(hydroxyether) based polyester

The reaction of poly(hydroxyether) prepolymer $C_3$ and hexahydro-iso-phthaloyl dichloride was carried out by the same methd as that employed in the Example 13, except using the following Material B and Material C.

Thereafter, the resulting mixture was washed five times with water, and the product was precipitated by adding methanol, and separated from the mixture, and dried under vacuum.

The properties of produce are shown hereinafter.

Material B:                      Parts by wt.
    Chloroform ———————————————————— 400
    Sodium hydroxide (0.02) —————————— 0.8
    Water ————————————————————— 20
    Trimethylbenzylammonium chloride ————— 0.7
    Poly(hydroxyether) prepolymer composition $C_3$ (0.015) whole volume (by wt.)

Material C:
  Hexahydro-iso-phthaloyl dischloride (0.015) ____ 3.14
  Chloroform _____ 200
  Properties of product:
    Melt index _____ 2.1
    Heat distortion temperature
      (66 p.s.i.) ° C. _____ 99
    Impact strength, notched Izod
      (ft. lb./in., notch) _____ 12.2

EXAMPLE 16

(a) Preparation of poly(hydroxyether) prepolymer composition $D_3$.

The reaction was carried out by the same method as that employed in the Example 13, except using the following Material A.

Thereafter, the resulting mixture was heated at a temperature of 40° C, for 10 hours, and cooled to room temperature.

Material A:                               Parts by wt.
  2,2-bis(4-hydroxyphenyl) propane (0.1) _____ 22.83
  Epichlorohydrin (0.08) _____ 7.41
  Tertiary butylalcohol _____ 23.0
  Sodium hydroxide (0.09) _____ 3.6
  Water _____ 17

(b) Preparation fo poly(hydroxyether based polyester

The reaction of poly(hydroxyether) prepolymer $D_3$ and hexahydroterephthaloyl dichloride was carried out by the same method as that employed in the Example 13, except using the following Material B and Material C.

Thereafter, the resulting mixture was washed five times with water, and the product was precipitated by adding methanol, and separated from the mixture, and dried under vacuum.

The properties of product are shown hereinafter.

Material B:                               Parts by wt.
  Chloroform _____ 400
  Sodium hydroxide (0.025) _____ 1
  Water _____ 20
  Tetramethyl ammonium chloride _____ 0.7
  Poly(hydroxyether) prepolymer composition $D_3$
    (0.02) whole volume (by wt.)
Material C:
  Hexahydroterephthaloyl dichloride (0.02) _____ 4.18
  Chloroform _____ 200
  Properties of product:
    Melt Index _____ 1.12
    Heat distortion temperature
      (66 p.s.i.) ° C. _____ 104
    Impact strength, notched Izod
      (ft. lb./in., notch) _____ 16.2

EXAMPLE 17

(a) Preparation of poly(hydroxyether) propolymer composition $E_3$

The reaction was carried out by the same method as that employed in the Example 13, except using the following Material A.

Thereafter, the resulting mixture was heated at a temperature of 50° C., for 6 hours, and cooled to room temperature.

Material A:                               Parts by wt.
  4,4'-dihydroxydiphenyl-ether (0.1) _____ 20.2
  Epichlorohydrin (0.085) _____ 7.87
  Tertiary butylalcohol _____ 23.0
  Sodium hydroxide (0.095) _____ 3.8
  Water _____ 17.4

(b) Preparation of poly(hydroxyether) based polyester

The reaction of poly(hydroxyether) prepolymer $E_3$ and hexahydro-isophthaloyl dichloride was carried out by the same method as that employed in the Example 13, except using the following Material B and Material C.

Thereafter, the resulting mixture was washed five times with water, and the product was precipitated by adding methanol, and separated from the mixture, and dried under vacuum.

The properties of product are shown hereinafter.

Material B:                               Parts by wt.
  Chloroform _____ 400
  Sodium hydroxide (0.02) _____ 0.8
  Water _____ 20
  Tetramethyl ammonium chloride _____ 0.7
  Poly(hydroxyether) prepolymer composition $E_3$
    (0.015) whole volume (by wt.)
Material C:
  Hexahydro-iso-phthaloyl dichloride (0.015) ____ 3.14
  Chloroform _____ 200
  Properties of product;
    Melt index _____ 0.35
    Heat distortion temperature
      (66 p.s.i.) ° C. _____ 149
    Impact strength, notched Izod
      (ft. lb./in., notch) _____ 12.3

EXAMPLE 18

The poly(hydroxyether) prepolymers $A_3$, $B_3$, $C_3$ and $D_3$ that were shown in the Examples 13, 14, 15 and 16 respectively, were washed with dilute hydrochloric acid and washed six times with water to remove sodium hydroxide and sodium chloride.

Then, 400 parts of chloroform, 20 parts of water, 0.5 parts trimethylbenzyl ammonium chloride and the same parts of sodium hydroxide as indicated in the Table III, were added to poly(hydroxyether) prepolymer and dissolved by agitation.

Chloroform solution of hexahydroterephthaloyl dichloride was added to the mixture and stirred for 30 minutes.

Thereafter the resulting mixture was washed five times with water, and the product was purified by the same manner as that employed in the Example 13.

TABLE III.—THE RELATIONS BETWEEN REACTION CONDITIONS OF POLY(HYDROXYETHER) PREPOLYMER AND ACID CHLORIDE, AND PROPERTIES OF PRODUCED POLYETHER-ESTER RESINS

| Kind of poly (hydroxyether) prepolymer | Added volume of— | | | | Properties of produced resins | | | |
|---|---|---|---|---|---|---|---|---|
| | Sodium hydroxide | | Hexahydro-terephthaloyl-dichloride | | Reaction temperature (° C.) | Malt index at 220° C. 44 p.s.i. (g./10 min.) | Heat distortion temperature at 66 p.s.i. (° C.) | Impact strength, notched izod (ft. lb./in., notch) |
| | Part | Mole | Part | Mole | | | | |
| 1 $A_3$ | 0.12 | 0.03 | 1.05 | 0.0050 | 0–5 | 0.44 | 98 | 13.1 |
| 2 $A_3$ | 0.12 | 0.03 | 1.15 | 0.0055 | 0–5 | 6.10 | 80 | 3.1 |
| 3 $B_3$ | 0.12 | 0.03 | 2.09 | 0.010 | 0–5 | 1.65 | 104 | 15.1 |
| 4 $B_3$ | 0 | 0 | 2.09 | 0.010 | 0–5 | <0.1 | This product did not substantially show plasticity | |
| 5 $C_3$ | 0.12 | 0.03 | 3.14 | 0.015 | 0–5 | 0.91 | 107 | 15.2 |
| 6 $C_3$ | 0.12 | 0.03 | 3.14 | 0.015 | 45–55 | <0.1 | This product did not substantially show plasticity. | |
| 7 $D_3$ | 0.16 | 0.04 | 4.18 | 0.020 | 0–5 | 0.89 | 107 | 14.2 |
| 8 $D_3$ | 0.16 | 0.04 | 3.76 | 0.018 | 0–5 | 14.21 | 63 | 2.6 |

1, 3, 5 and 7 in Table III are the examples according to the invention, and 2, 4, 6 and 8 are the examples for comparison.

EXAMPLE 19

The reaction vessel fitted with a stirrer and a thermometer, was charged with the following Material B while stirring.

Then the following Material C was added to the reaction, the mixture was maintained at a temperature of carried out by stirring the mixture of Material B and Material C for 30 minutes, thereafter hydro chloric acid was added, and the reaction was stopped. During the reaction, the mixture was maintained at a temperature of 5–10° C.

The resulting mixture was washed five times with water, and the product was precipitated by adding methanol, and separated from the mixture, and dried under vacuum.

The properties of product are shown hereinafter.

| Material B: | Parts by wt. |
|---|---|
| Chloroform | 400 |
| Water | 20 |
| Dimethylbenzyl amine | 0.5 |
| Poly(hydroxyether)prepolymer composition $A_3$ (0.005) whole volume by wt. | |

Material C:

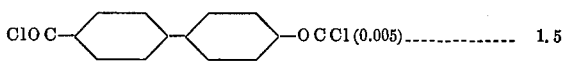

| | |
|---|---|
| (0.005) | 1.5 |
| Chloroform | 300 |
| Properties of product: | |
| Heat distortion temperature (66 p.s.i.) ° C. | 107 |
| Impact strength, notched Izod (ft. lb./in., notch) | 12.5 |

EXAMPLE 20

(a) Preparation of poly(hydroxyether) prepolymer composition $A_4$

The reaction vessel fitted with a sealed stirrer, a thermometer and reflux condenser, was charged with the following Material A. The reaction was carried out by stirring the Material A at 30° C. for 30 hours. During this reaction, in every occasion that the mixture became too viscous to stir, monochlorobenzene was added to the mixture, until total weight of monochlorobenzene became to ten parts.

Thereafter, the resulting mixture was heated at a temperature of 72–75° C. for 6 hours and cooled to room temperature.

| Material A: | Parts by wt. |
|---|---|
| 2,2-bis(4-hydroxyphenyl) propane (0.1) | 22.83 |
| Epichlorohydrin (0.095) | 8.80 |
| Tertiary butylalcohol | 23.0 |
| Sodium hydroxide (0.105) | 4.2 |
| Water | 16.1 |

The number in parentheses ( ) indicate mole-ratio. This applies correspondingly in the following cases.

(b) Preparation of poly(hydroxyether) based polyester

The reaction vessel fitted with a stirrer and a thermometer, was charged with the following Material B while stirring.

Then the following Material C was added to the reaction vessel under vigorous agitation. The reaction was carried out by stirring the mixture of Material B and Material C for 30 minutes, thereafter hydrochloric acid was added, and the reaction was stopped. During the reaction, the mixture was maintained at a temperature of 0–5° C.

The resulting mixture was washed five times with water, and the product was precipitated by adding methanol, and separated from the mixture, and dried under vacuum.

The properties of product are shown hereinafter.

| Material B: | Parts by wt. |
|---|---|
| Chloroform | 400 |
| Water | 20 |
| Dimethylbenzyl amine | 0.5 |
| Poly(hydroxyether) prepolymer composition $A_4$ (0.005) whole volume by wt. | |

| Material C: | Parts by wt. |
|---|---|
| p-Phenylene diacetyl dichloride (0.005) | 1.15 |
| Chloroform | 200 |
| Properties of product: | |
| Melt index | 1.25 |
| Heat distortion temperature (66 p.s.i.) ° C. | 93 |
| Impact strength, notched Izod (ft. lb./in., notch) | 10.6 |

EXAMPLE 21

(a) Preparation of poly(hydroxyether) prepolymer composition $B_4$

The reaction was carried out by the same method as that employed in the Example 20, except using the following Material A.

Thereafter, the resulting mixture was heated at a temperature of 60° C., for 6 hours, and cooled to room temperature.

| Material A: | Parts by wt. |
|---|---|
| 2.2-bis(4-hydroxyphenyl) propane (0.1) | 22.83 |
| Epichlorohydrin (0.09) | 8.33 |
| Tertiary butylalcohol | 23.0 |
| Sodium hydroxide (0.1) | 4.0 |
| Water | 16.8 |

(b) Preparation of poly(hydroxyether) based polyester

The reaction of poly(hydroxyether) prepolymer $B_4$ and p-phenylene dipropyl dichloride was carried out by the same method as that employed in the Example 20, except using the following Material B and Material C.

Thereafter, the resulting mixture was washed five times with water, and the product was precipitated by adding methanol, and separated from the mixture, and dried under vacuum.

The properties of product are shown hereinafter.

| Material B: | Parts by wt. |
|---|---|
| Chloroform | 400 |
| Sodium hydroxide (0.01) | 0.4 |
| Water | 20 |
| Trimethylbenzylammonium chloride | 0.5 |
| Poly(hydroxyether) prepolymer composition $B_4$ (0.01) whole volume by wt. | |

| Material C. | Parts by wt. |
|---|---|
| p-Phenylene dipropyl dichloride (0.01) | 2.59 |
| Chloroform | 200 |
| Properties of product: | |
| Melt index | 2.2 |
| Heat distortion temperature (66 p.s.i.) ° C. | 98 |
| Impact strength, notched Izod (ft. lb./in., notch) | 16.9 |

EXAMPLE 22

(a) Preparation of poly(hydroxyether) prepolymer composition $C_4$

The reaction was carried out by the same method as that employed in the Example 20, except using the following Material A.

Thereafter, the resulting mixture was heated at a temperature of 50° C. for 6 hours, and cooled to room temperature.

Material A: Parts by wt.
  2,2-bis)-4-hydroxyphenyl) propane (0.1) ____ 22.83
  Epichlorohydrin (0.085) _____ 7.87
  Tertiary butylalcohol _____ 23.0
  Sodium hydroxide (0.095) _____ 3.8
  Water _____ 17.4

(b) Preparation of poly(hydroxyether) based polyester

The reaction of poly(hydroxyether) prepolymer $C_4$ and p-phenylene diacetyl dichloride was carried out by the same method as that employed in the Example 20, except using the following Material B and Material C.

Thereafter, the resulting mixture was washed five times with water, and the product was precipitated by adding methanol, and separated from the mixture, and dried under vacuum.

The properties of product are shown hereinafter.

Material B: Parts by wt.
  Chloroform _____ 400
  Sodium hydroxide (0.02) _____ 0.8
  Water _____ 20
  Trimethylbenzylammonium chloride _____ 0.7
  Poly(hydroxyether) prepolymer composition $C_4$
    (0.015) whole volume by wt.

Material C:
  p-Phenylene diacetyl dichloride (0.015) _____ 3.47
  Chloroform _____ 200
  Properties of product:
    Melt index _____ 2.6
    Heat distortion temperature (66 p.s.i.) ° C. __ 96
    Impact strength, notched Izod (ft. lb./in., notch) _____ 3.2

EXAMPLE 23

(a) Preparation of poly(hydroxyether) prepolymer composition $D_4$

The reaction was carried out by the same method as that employed in the Example 20, except using the following Material A.

Thereafter, the resulting mixture was heated at a temperature of 40° C., for 10 hours, and cooled to room temperature.

Material A: Parts by wt.
  2,2-bis(4-hydroxyphenyl) propane (0.1) _____ 22.83
  Epichlorohydrin (0.08) _____ 7.41
  Tertiary butylalcohol _____ 23.0
  Sodium hydroxide (0.09) _____ 3.6
  Water _____ 17

(b) Preparation of poly(hydroxyether) based polyester

The reaction of poly(hydroxyether) prepolymer $D_4$ and p-phenylene diacetyl dichloride was carried out by the same method as that employed in the Example 20, except using the following Material B and Material C.

Thereafter, the resulting mixture was washed five times with water, and the product was precipitated by adding methanol, and separated from the mixture, and dried under vacuum.

The properties of product are shown hereinafter.

Material B: Parts by wt.
  Chloroform _____ 400
  Sodium hydroxide (0.025) _____ 1
  Water _____ 20
  Tetramethylammonium chloride _____ 0.7
  Poly(hydroxyether) prepolymer composition $D_4$
    (0.02) whole volume by wt.

Material C:
  p-Phenylene diacetyl dichloride (0.02) _____ 4.62
  Chloroform _____ 200
  Properties of product:
    Melt index _____ 1.29
    Heat distortion temperature (66 p.s.i.) ° C.__ 101
    Impact strength, notched Izod (ft. lb./in., notch) _____ ---

EXAMPLE 24

(a) Preparation of poly(hydroxyether) prepolymer composition $E_4$

The reaction was carried out by the same method as that employed in the Example 20, except using the following Material A.

Thereafter, the resulting mixture was heated at a temperature of 50° C., for 6 hours, and cooled to room temperature.

Material A: Parts by wt.
  4,4'-dihydroxydiphenyl-ether (0.1) _____ 20.2
  Epichlorohydrin (0.085) _____ 7.87
  Tertiary butylalcohol _____ 23.0
  Sodium hydroxide (0.095) _____ 3.8
  Water _____ 17.4

(b) Preparation of poly(hydroxyether) based polyester

The reaction of poly(hydroxyether) prepolymer $E_4$ and p-phenylene diacetyl dichloride was carried out by the same method as that employed in the Example 20, except using the following Material B and Material C.

Thereafter, the resulting mixture was washed five times with water, and the product was precipitated by adding methanol, and separated from the mixture, and dried under vacuum.

The properties of product are shown hereinafter.

Material B: Parts by wt.
  Chloroform _____ 400
  Sodium hydroxide (0.02) _____ 0.8
  Water _____ 20
  Trimethylbenzylammonium chloride _____ 0.7
  Poly(hydroxyether) prepolymer composition $E_4$
    (0.015) whole volume by wt.

Material C:
  p-Phenylene diacetyl dichloride (0.015) _____ 3.74
  Chloroform _____ 200
  Properties of product:
    Melt index _____ 0.45
    Heat distortion temperature (66 p.s.i.) ° C. __ 135
    Impact strength, notched Izod (ft. lb./in., notch) _____ 12.5

EXAMPLE 25

The poly(hydroxyether) prepolymer $A_4$, $B_4$, $C_4$ and $D_4$ that was shown in the Example 20, 21, 22 and 23 respectively, were washed with dilute hydrochloric acid and washed six times with water to remove sodium hydroxide and sodium chloride.

Then, 400 parts of chloroform, 20 parts of water, 0.5 part trimethylbenzyl ammonium chloride and the same parts of sodium hydroxide as indicated in the Table IV, were added to poly(hydroxyether) prepolymer and dissolved by agitation.

Chloroform solution of p-phenylene diacetyl dichloride was added to the mixture and stirred for 30 minutes.

Thereafter the resulting mixture was washed five times with water, and the product was purified by the same manner as that employed in the Example 20.

The results were shown in the Table IV.

TABLE IV.—THE RELATIONS BETWEEN REACTION CONDITIONS OF POLY(HYDROXYETHER) PREPOLYMER AND ACID CHLORIDE, AND PROPERTIES OF PRODUCED POLYETHER-ESTER RESINS

| Kind of poly(hydroxyether) prepolymer | Added volume of— | | | | Properties of produced resins | | | |
|---|---|---|---|---|---|---|---|---|
| | Sodium hydroxide | | p-Phenylene diacetyl dichloride | | Reaction temperature (° C.) | Melt index at 220° C. 44 p.s.i. (g./10 min.) | Heat distortion temperature at 66 p.s.i. (° C.) | Impact strength, notched izod (ft. lb./in., notch) |
| | Part | Mole | Part | Mole | | | | |
| 1 $A_4$ | 0.12 | 0.03 | 1.02 | 0.0050 | 0–5 | 0.48 | 96 | 11.1 |
| 2 $A_4$ | 0.12 | 0.03 | 1.12 | 0.0055 | 0–5 | 6.31 | 79 | 3.0 |
| 3 $B_4$ | 0.12 | 0.03 | 2.03 | 0.010 | 0–5 | 1.75 | 101 | 16.0 |
| 4 $B_4$ | 0 | 0 | 2.03 | 0.010 | 0–5 | <0.1 | This product did not substantially show plasticity | |
| 5 $C_4$ | 0.12 | 0.03 | 3.05 | 0.015 | 0–5 | 0.98 | 103 | 14.8 |
| 6 $C_4$ | 0.12 | 0.03 | 3.05 | 0.015 | 45–55 | <0.1 | This product did not substantially show plasticity | |
| 7 $D_4$ | 0.16 | 0.04 | 4.05 | 0.020 | 0–5 | 0.90 | 102 | 15.1 |
| 8 $D_4$ | 0.16 | 0.04 | 3.66 | 0.018 | 0–5 | 14.35 | 60 | 2.0 |

1, 3, 5 and 7 in the Table IV are the examples according to the invention, and 2, 4, 6 and 8 are the examples for comparison.

EXAMPLE 26

The reaction vessel fitted with a stirrer and a thermometer, was charged with the following Material B while stirring.

Then the following Material C was added to the reaction vessel under vigorous agitation. The reaction was carried out by stirring the mixture of Material B and Material C for 30 minutes, thereafter hydrochloric acid was added, and the reaction was stopped. During the reaction, the mixture was maintained at a temperature of 5–10° C.

The resulting mixture was washed five times with water, and the product was precipitated by adding methanol, and separated from the mixture, and dried under vacuum.

The properties of product are shown hereinafter.

Material B: Parts by wt.
Chloroform _____ 400
Water _____ 20
Dimethylbenzyl amine _____ 0.5
Poly(hydroxyether) prepolymer composition $A_4$ (0.005) whole volume by wt.

Material C:

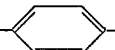
ClOC—CH₂—〈 〉—〈 〉—CH₂—COCl (0.005)_ 1.5

Chloroform _____ 300
Properties of product:
Heat distortion temperature (66 p.s.i.) ° C. __ 105
Impact strength, notched Izod (ft. lb./in., notch) _____ 13.1

EXAMPLE 27

The reaction of poly(hydroxyether) prepolymer $B_4$ and acid chloride was carried out by the same method as that employed in the Example 26, except using the following Material B and Material C.

Thereafter, the resulting mixture was washed five times with water, and the product was precipitated by adding methanol, and separated from the mixture, and dried under vacuum.

The properties of product are shown hereinafter.

Material B: Parts by wt.
Chloroform _____ 400
Sodium hydroxide _____ 0.4
Water _____ 20
Trimethylbenzylammonium chloride _____ 0.5
Poly(hydroxyether) prepolymer composition $B_4$ (0.01) whole volume by wt.

Material C:

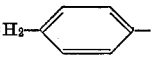
ClOC—CH₂—〈 〉—CH₂—〈 〉—CH₂—COCl (0.01) _____ 3.21

Chloroform _____ 300
Properties of product:
Heat distortion temperature (66 p.s.i.) ° C. __ 106
Impact strength, notched Izod (ft. lb./in., notch) _____ 16.2

EXAMPLE 28

The reaction of poly(hydroxyether) prepolymer $C_4$ and acid chloride was carried out by the same method as that employed in the Example 26, except using the following Material B and Material C.

Thereafter, the resulting mixture was washed five times with water, and the product was precipitated by adding methanol, and separated from the mixture, and dried under vacuum.

The properties of product are shown hereinafter.

Material B: Parts by wt.
Chloroform _____ 400
Sodium hydroxide (0.02) _____ 0.8
Water _____ 20
Trimethylbenzylammonium chloride _____ 0.7
Poly(hydroxyether) prepolymer composition $C_4$ (0.015) whole volume by wt.

Material C:

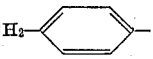
ClOC—CH₂—〈 〉—CH₂CH₂—〈 〉—CH₂—COCl (0.015) _____ 5.

Chloroform _____ 350
Properties of product:
Heat distortion temperature (66 p.s.i.) ° C. __ 99
Impact strength, notched Izod (ft. lb./in., notch) _____ 17.6

EXAMPLE 29

The reaction of poly(hydroxyether) prepolymer $D_4$ and acid chloride was carried out by the same method as that employed in the Example 26, except using the following Material B and Material C.

Thereafter, the resulting mixture was washed five times with water, and the product was precipitated by adding methanol, and separated from the mixture, and dried under vacuum.

The properties of product are shown hereinafter.

Material B:
Parts by wt.
Chloroform _____ 400
Sodium hydroxide (0.025) _____ 1
Water _____ 20
Tetramethylammonium chloride _____ 0.7
Poly(hydroxyether) prepolymer composition $D_4$ (0.02) whole volume by wt.

Material C:

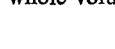
ClOC—CH₂—〈 〉—O—〈 〉—CH₂—COCl (0.02) _____ 6.5

Chloroform ――――――――――――――――― 300
Properties of product:
    Heat distortion temperature (66 p.s.i.) ° C. __ 106
    Impact strength, notched Izod (ft. lb./in., notch) ――――――――――――――――― 15.5

EXAMPLE 30

The reaction of poly(hydroxyether) prepolymer $E_4$ and acid chloride was carried out by the same method as that employed in the Example 26, except using the following Material B and Material C.

Thereafter, the resulting mixture was washed five times with water, and the product was precipitated by adding methanol, and separated from the mixture, and dried under vacuum.

The properties of product are shown hereinafter.

Material B:

|  | Parts by wt. |
|---|---|
| Chloroform | 400 |
| Sodium hydroxide (0.02) | 0.8 |
| Water | 20 |
| Trimethylbenzylammonium chloride | 0.7 |
| Poly(hydroxyether) prepolymer composition $E_4$ (0.015) whole volume by wt. | |

Material C:

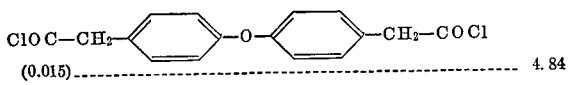

| | |
|---|---|
| (0.015) | 4.84 |
| Chloroform | 300 |

Properties of product:
    Heat distortion temperature (66 p.s.i.) ° C. __ 124
    Impact strength, notched Izod (ft. lb./in., notch) ――――――――――――――――― 16.2

EXAMPLE 31

(a) Preparation of poly(hydroxyether) prepolymer composition $A_5$

The reaction vessel fitted with a sealed stirrer, a thermometer and reflux condenser, was charged with the following Material A. The reaction was carried out by stirring the Material A at 30° C. for 30 hours. During this reaction, in every occasion that the mixture became too viscous to stir, monochlorobenzene was added to the mixture, until total weight of monochlorobenzene became to ten parts.

Thereafter, the resulting mixture was heated at a temperature of 72–75° C., for 6 hours and cooled to room temperature.

Material A:

|  | Parts by wt. |
|---|---|
| 2,2-bis(4-hydroxyphenyl) propane (1) | 22.83 |
| Epichlorohydrin (0.95) | 8.80 |
| Tertiary butyl alcohol | 23.0 |
| Sodium hydroxide (1.05) | 4.2 |
| Water | 16.1 |

The numbers in (#) indicate mole-ratio. This applies correspondingly to the following cases.

(b) Preparation of bischloroformate of 2,2-bis(4-hydroxyphenyl) propane

Phosgen of 200 parts was dissolved in toluene of 2000 parts by volume.

2,2-bis(4-hydroxyphenyl) propane of 228 parts which was dissolved in dioxane of 1000 parts by volume, was added to the phosgen solution, and dimethyl aniline of 242 parts which was dissolved in dioxane of 240 parts by volume was added to the mixture. During addition of dimethylaniline, the temperature of the mixture rose to 47° C.

Thereafter, the temperature of the mixture was risen to 85° C. for 3 hours, and the mixture was left overnight.

After the reaction, dimethylaniline-hydrochloride which is a by-product, was separated by filtering.

85 mm. Hg at first and of 1 mm. Hg absolute pressure thereafter. The distillation was carried out until all of the solvent evaporated.

Thus, bischloroformate of 2,2-bis(4-hydroxyphenyl) propane was obtained.

This product was recrystallized from methylenechloride and purified.

(c) Preparation of poly(hydroxyether) based polyester

The reaction vessel fitted with a stirrer and a thermometer, was charged with the following Material B while stirring.

Then the following Material C was added to the reaction vessel under vigorous agitation. The reaction was carried out by stirring the mixture of Material B and Material C for 30 minutes, thereafter hydrochloric acid was added, and the reaction was stopped. During the reaction, the mixture was maintained at a temperature of 5–9° C.

The resulting mixture was washed five times with water, and the product was precipitated by adding methanol, and separated from the mixture and dried under vacuum.

The properties of product are shown hereinafter.

Material B:

|  | Parts by wt. |
|---|---|
| Chloroform | 400 |
| Water | 20 |
| Dimethylbenzyl amine | 0.5 |
| Poly(hydroxyether) prepolymer composition $A_5$ (0.05) whole volume by wt. | |

Material C:

|  | Parts by wt. |
|---|---|
| Bischloroformate of 2,2-bis(4-hydroxyphenyl) propane (0.05) | 1.77 |
| Chloroform | 200 |

Properties of product:
    Melt index ――――――――――――――――― 0.51
    Heat distortion temperature (66 p.s.i.) ° C. _ 101
    Impact strength, notched Izod (ft. lb./in., notch) ――――――――――――――――― 15.2

EXAMPLE 32

(a) Preparation of poly(hydroxyether) prepolymer composition $B_5$

The reaction was carried out by the same method as that employed in the Example 31, except using the following Material A.

Thereafter, the resulting mixture was heated at a temperature of 60° C., for 6 hours, and cooled to room temperature.

Material A:

|  | Parts by wt. |
|---|---|
| 2,2-bis(4-hydroxyphenyl) propane (1) | 22.83 |
| Epichlorohydrin (0.9) | 8.33 |
| Tertiary butylalcohol | 23.0 |
| Sodium hydroxide (1) | 4.0 |
| Water | 16.8 |

(b) Preparation of poly(hydroxyether) based polyester

The reaction of poly(hydroxyether) prepolymer $B_5$ and bischloroformate of bis(4-hydroxyphenyl) ether was carried out by the same method as that employed in the Example 31, except using the following Material B and Material C.

Thereafter, the resulting mixture was washed five times with water, and the product was precipitated by adding methanol, and separated from the mixture, and dried under vacuum.

The properties of product are shown hereinafter.

Material B:

|  | Parts by wt. |
|---|---|
| Chloroform | 400 |
| Sodium hydroxide (0.1) | 0.4 |
| Water | 20 |
| Trimethylbenzylammonium chloride | 0.5 |
| Poly(hydroxyether) prepolymer composition $B_5$ (0.1) whole volume by wt. | |

Material C:
  Bischloroformate of bis(4-hydroxyphenyl) ether
    (0.1) ------------------------------------- 3.27
  Chloroform ---------------------------------- 200
  Properties of product:
    Melt index -------------------------------- 1.12
    Heat distortion temperature (66 p.s.i.) ° C. _ 111
    Impact strength, notched izod (ft. lb./in.,
      notch) ---------------------------------- 17.1

EXAMPLE 33

(a) Preparation of poly(hydroxyether) prepolymer composition $C_5$

The reaction was carried out by the same method as that employed in the Example 31, except using the following Material A.

Thereafter, the resulting mixture was heated at a temperature of 50° C., for 6 hours, and cooled to room temperature.

Material A: | Parts by wt.
  2,2-bis(4-hydroxyphenyl) propane (1) ------- 22.83
  Epichlorohydrin (0.85) --------------------- 7.87
  Tertiary butylalcohol ---------------------- 23.0
  Sodium hydroxide (0.95) -------------------- 3.8
  Water -------------------------------------- 17.4

(b) Preparation of poly(hydroxyether) based polyester

The reaction of poly(hydroxyether) prepolymer $C_5$ and bischloroformate of bis(4-hydroxyphenyl) sulfone was carried out by the same method as that employed in the Example 31, except using the following Material B and Material C.

Thereafter, the resulting mixture was washed five times with water, and the product was precipitated by adding methanol, and separated from the mixture, and dried under vacuum.

The properties of product are shown hereinafter.

Material B: | Parts by wt.
  Chloroform --------------------------------- 400
  Sodium hydroxide (0.2) --------------------- 0.8
  Water -------------------------------------- 20
  Trimethylbenzylammonium chloride ----------- 0.7
  Poly(hydroxyether) prepolymer composition $C_5$
    (0.15) whole volume by wt.

Material C:
  Bischloroformate of bis(4-hydroxyphenyl) sulfone (0.15) ---------------------------- 5.63
  Chloroform --------------------------------- 200
  Properties of product:
    Melt index -------------------------------- 0.48
    Heat distortion temperature (66 p.s.i.) ° C. _ 121
    Impact strength, notched Izod (ft. lb./in.
      notch) ---------------------------------- 13.1

EXAMPLE 34

(a) Preparation of poly(hydroxyether) prepolymer composition $D_5$

The reaction was carried out by the same method as that employed in the Example 31, except using the following Material A.

Thereafter, the resulting mixture was heated at a temperature of 40° C., for 10 hours, and cooled to room temperature.

Material A: | Parts by wt.
  2,2-bis(4-hydroxyphenyl) propane (1) ------- 22.83
  Epichlorohydrin (0.8) ---------------------- 7.41
  Tertiary butylalcohol ---------------------- 23.0
  Sodium hydroxide (0.9) --------------------- 3.6
  Water -------------------------------------- 17

(b) Preparation of poly(hydroxyether) based polyester

The reaction of poly(hydroxyether) prepolymer $D_5$ and bischloroformate of bis (4-hydroxyphenyl) methane was carried out by the same method as that employed in the Example 31, except using the following Material B and Material C.

Thereafter, the resulting mixture was washed five times with water, and the product was precipitated by adding methanol, and separated from the mixture, and dried under vacuum.

The properties of product are shown hereinafter.

Material B: | Parts by wt.
  Chloroform --------------------------------- 400
  Sodium hydroxide (0.25) -------------------- 1
  Water -------------------------------------- 20
  Tetramethyl ammonium chloride -------------- 0.7
  (Polyhydroxyether) prepolymer
    composition $D_5$ (0.2) whole volume by wt.

Material C:
  Bischloroformate of bis(4-hydroxyphenyl)
    methane (0.2) ---------------------------- 6.50
  Chloroform --------------------------------- 200
  Properties of product:
    Melt index -------------------------------- 1.02
    Heat distortion temperature (66 p.s.i.) ° C. 109
    Impact strength, notched Izod (ft.
      lb./inch., notch) ------------------------ 15.1

EXAMPLE 35

Preparation of poly(hydroxyether) prepolymer composition $E_5$

The reaction was carried out by the same method as that employed in the Example 31, except using the following Material A.

Thereafter, the resulting mixture was heated at a temperature of 50° C., for 6 hours, and cooled to room temperature.

Material A: | Parts by wt.
  4,4'-dihydroxydiphenyl ether (1) ----------- 20.2
  β-Methyl-epichlorohydrin (0.85) ------------ 9.14
  Tertiary butylalcohol ---------------------- 23.0
  Sodium hydroxide (0.95) -------------------- 3.8
  Water -------------------------------------- 17.4

(b) Preparation of poly(hydroxyether) based polyester

The reaction of poly(hydroxyether) prepolymer $E_5$ and bischloroformate of resorcinol was carried out by the same method as that employed in the Example 31, except using the following Material B and Material C.

Thereafter, the resulting mixture was washed five times with water, and the product was precipitated by adding methanol, and separated from the mixture, and dried under vacuum.

The properties of product are shown hereinafter.

Material B: | Parts by wt.
  Chloroform --------------------------------- 400
  Sodium hydroxide (0.2) --------------------- 0.8
  Water -------------------------------------- 20
  Trimethylbenzylammonium chloride ----------- 0.7
  Poly(hydroxyether) prepolymer composition
    $E_5$ (0.15) whole volume by wt.

Material C:
  Bischloroformate of resorcinol (0.15) ------ 3.53
  Chloroform --------------------------------- 200
  Properties of product:
    Melt index -------------------------------- 0.31
    Heat distortion temperature (66 p.s.i.) ° C. -- 149
    Impact strength, notched Izod (ft.
      lb./in., notch) ------------------------- 13.9

EXAMPLE 36

The poly(hydroxyether) prepolymer $A_5$, $B_5$, $C_5$ and $D_5$ that was shown in the Example 31, 32, 33 and 34 respectively, were washed with dilute hydrochloric acid and washed six times with water to remove sodium hydroxide and sodium chloride.

Then, 400 parts of chloroform, 20 parts of water, 0.5 part trimethylbenzyl ammonium chloride and the same parts of sodium hydroxide as indicated in the Table V, were added to poly(hydroxyether) prepolymer and dissolved by agitation.

Chloroform solution of bischloroformate of 2,2-bis (4-hydroxyphenyl) propane was added to the mixture and stirred for 30 minutes.

Thereafter the resulting mixture was washed five times with water, and the product was purified by the same manner as that employed in the Example 31.

The results were shown in the Table V.

Solution B.—6.33 gr. (0.025 mole) of the acid chloride which were indicated in the Table VI, was dissolved in 200 gr. of chloroform.

Solutions A and B were mixed and the mixture was stirred vigorously.

The reaction of poly(hydroxyether) prepolymer and acid chloride was carried out by stirring at a temperature of 5° C. for 50 minutes.

Thereafter the resulting mixture was washed five times with water, and the product was purified by the same manner as that employed in the Example 31.

The results were shown in the Table VI.

TABLE VI

| No. | Haloformate | Melt index | Heat distortion temp. (° C.) | Impact strength, notched izod (ft. lb./in notch) |
|---|---|---|---|---|
| 37-1 | Bischloroformate of 1,5-dihydroxynaphthalene. | 0.86 | 109 | 13.2 |
| 37-2 | Bischloroformate of 2,6-dihydroxynaphthalene. | 0.82 | 110 | 12.5 |
| 37-3 | Mixture of bischloroformate of 1,5- and 2,6-dihydroxynaphthalene. | 0.95 | 106 | 14.1 |

EXAMPLE 38

(a) Preparation of poly(hydroxyether) prepolymer composition $A_6$

The reaction vessel fitted with a sealed stirrer, a thermometer and reflux condenser, was charged with the TABLE V.—THE RELATIONS BETWEEN REACTION CONDITIONS OF POLY(HYDROXYETHER)PREPOLYMER AND ACID CHLORIDE, AND PROPERTIES OF PRODUCED POLYETHER-ESTER RESINS

| | Added volume of— | | | | | Properties of produced resins | | |
|---|---|---|---|---|---|---|---|---|
| | Sodium hydroxide | | Bischloroformate of 2,2-bis(4-hydroxyphenyl propane | | Reaction temperature (° C.) | Melt index at 220° C., 44 p.s.i. (g./10 min.) | Heat distortion temperature at 66 p.s.i. (° C.) | Impact strength, notched izod (ft. lb./in. notch) |
| Kind of poly(hydroxyether) prepolymer | Part | Mole | Part | Mole | | | | |
| 1 $A_5$ | 0.12 | 0.03 | 1.77 | 0.0050 | 5–10 | 0.51 | 101 | 15.2 |
| 2 $A_5$ | 0.12 | 0.03 | 1.94 | 0.0055 | 5–10 | 7.20 | 79 | 3.1 |
| 3 $B_5$ | 0.12 | 0.03 | 3.53 | 0.010 | 5–10 | 2.25 | 106 | 17.2 |
| 4 $B_5$ | 0 | 0 | 3.53 | 0.010 | 5–10 | <0.1 | This product did not substantially show plasticity | |
| 5 $C_5$ | 0.12 | 0.03 | 5.30 | 0.015 | 5–10 | 1.16 | 108 | 18.1 |
| 6 $C_5$ | 0.12 | 0.03 | 5.30 | 0.015 | 55–60 | <0.1 | This product did not substantially show plasticity | |
| 7 $D_5$ | 0.16 | 0.04 | 7.06 | 0.020 | 5–10 | 1.12 | 108 | 21.0 |
| 8 $D_5$ | 0.16 | 0.04 | 6.35 | 0.018 | 5–10 | 19 30 | 66 | 1.9 |

1, 3, 5 and 7 in the Table V are the examples according to the invention, and 2, 4, 6 and 8 are the examples for comparison.

EXAMPLE 37

(a) Preparation of poly(hydroxyether) prepolymer composition

| | Gr. |
|---|---|
| Bisphenol A (0.10 mole) | 22.83 |
| Epichlorohydrin (0.075 mole) | 6.95 |
| Sodium hydroxide (0.0825 mole) | 3.5 |

(Note: purity of sodium hydroxide is 93%)

| | |
|---|---|
| Water | 12.5 |
| Iso-propanol | 23.0 |

The above reaction mixture was stirred at a temperature of 35° C. for 30 hours and thereafter heated at a temperature of 74–75° C. for 7 hours stirring.

When the reaction was completed, 1.83 gr. of sodium hydroxide (0.0425 mole) and 6.5 gr. of water was added to the resulting mixture.

(b) Preparation of poly(hydroxyether) based polyester

Solution A.—Poly(hydroxyether) prepolymer was dissolved in 400 gr. of chloroform, 20 gr. of water and 0.7 gr. of trimethyl-benzylammonium chloride as a catalyst.

following Material A. The reaction was carried out by stirring the Material A at 30° C. for 30 hours. During this reaction, in every occasion that the mixture became too viscous to stir, monochlorobenzene was added to the mixture, until total weight of monochlorobenzene became to ten parts.

Thereafter, the resulting mixture was heated at a temperature of 72–75° C., for 6 hours and cooled to room temperature.

Material A: Parts by wt.

| | |
|---|---|
| 2,2-bis(4-hydroxyphenyl)propane (1) | 22.83 |
| Epichlorohydrin (0.95) | 8.80 |
| Tertiary butyl alcohol | 23.0 |
| Sodium hydroxide (1.05) | 4.2 |
| Water | 16.1 |

The numbers in ( ) indicate mole-ratio. This applies correspondingly in the following cases.

(b) Preparation of poly(hydroxyether) based polyester

The reaction vessel fitted with a stirrer and a thermometer, was charged with the following Material B while stirring.

Then the following Material C was added to the reaction vessel under vigorous agitation. The reaction was carried out by stirring the mixture of Material B and Material C for 30 minutes, thereafter hydrochloric acid was added, and the reaction was stopped. During the reaction, the mixture was maintained at a temperature of 5–9° C.

The resulting mixture was washed five times with water, and the product was precipitated by adding methanol, and separated from the mixture, and dried under vacuum.

The properties of product are shown hereinafter.

| Material B: | Parts by wt. |
|---|---|
| Chloroform | 400 |
| Water | 20 |
| Dimethylbenzyl amine | 0.5 |
| Poly(hydroxyether) prepolymer composition $E_6$ (0.05) | whole volume by wt. |

| Material C: | |
|---|---|
| Bischloroformate of xyleneglycol (0.05) | 1.32 |
| Chloroform | 200 |
| Properties of product: | |
| Melt index | 1.81 |
| Heat distortion temperature (66 p.s.i.) ° C. | 98 |
| Impact strength, notched Izod (ft. lb./in., notch) | 14.8 |

EXAMPLE 39

(a) Preparation of poly(hydroxyether) prepolymer composition $B_6$

The reaction was carried out by the same method as that employed in the Example 38, except using the following Material A.

Thereafter, the resulting mixture was heated at a temperature of 60° C., for 6 hours, and cooled to room temperature.

| Material A: | Parts by wt. |
|---|---|
| 2,2-bis(4-hydroxyphenyl) propane (1) | 22.83 |
| Epichlorohydrin (0.9) | 8.33 |
| Tertiary butylalcohol | 23.0 |
| Sodium hydroxide (1) | 4.0 |
| Water | 16.8 |

(b) Preparation of poly(hydroxyether) based polyester

The reaction of poly(hydroxyether) prepolymer $B_6$ and bischloroformate of 2,2-bis(4-hydroxycyclohexyl) ether was carried out by the same method as that employed in the Example 38, except using the following Material B and Material C.

Thereafter, the resulting mixture was washed five times with water, and the product was precipitated by adding methanol, and separated from the mixture, and dried under vacuum.

The properties of product are shown hereinafter.

| Material B: | Parts by wt. |
|---|---|
| Chloroform | 400 |
| Sodium hydroxide (0.1) | 0.4 |
| Water | 20 |
| Trimethylbenzylammonium chloride | 0.5 |
| Poly(hydroxyether) prepolymer composition $B_6$ (0.1) | whole volume by wt. |

| Material C: | |
|---|---|
| Bischloroformate of 2,2 - bis(4 - hydroxycyclohexyl) ether (0.1) | 3.39 |
| Chloroform | 200 |
| Properties of product: | |
| Melt index | 1.33 |
| Heat distortion temperature (66 p.s.i.) ° C. | 106 |
| Impact strength, notched Izod (ft. lb./in., notch) | 16.9 |

EXAMPLE 40

(a) Preparation of poly(hydroxyether) prepolymer composition $C_6$

The reaction was carried out by the same method as that employed in the Example 38, except using the following Material A.

Thereafter, the resulting mixture was heated at a temperature of 50° C., for 6 hours, and cooled to room temperature.

| Material A: | Parts by wt. |
|---|---|
| 2,2-bis(4-hydroxyphenyl) propane (1) | 22.83 |
| Epichlorohydrin (0.85) | 7.87 |
| Tertiary butylalcohol | 23.0 |
| Sodium hydroxide (0.95) | 3.8 |
| Water | 17.4 |

(b) Preparation of poly(hydroxyether) based polyester

The reaction of poly(hydroxyether) prepolymer $C_6$ and bischloroformate of 1,4-dihydroxycyclohexane was carried out by the same method as that employed in the Example 38, except using the following Material B and Material C.

Therefore, the resulting mixture was washed five times with water, and the product was precipitated by adding methanol, and separated from the mixture, and dried under vacuum.

The properties of product are shown hereinafter.

| Material B: | Parts by wt. |
|---|---|
| Chloroform | 400 |
| Sodium hydroxide (0.2) | 0.8 |
| Water | 20 |
| Trimethylbenzylammonium chloride | 0.7 |
| Poly(hydroxyether) prepolymer composition $C_6$ (0.15) | whole volume by wt. |

| Material C: | |
|---|---|
| Bischloroformate of 1,4-dihydroxycyclohexane (0.15) | 3.62 |
| Chloroform | 200 |
| Properties of product: | |
| Melt index | 1.34 |
| Heat distortion temperature (66 p.s.i.) ° C. | 108 |
| Impact strength, notched Izod (ft. lb./in., notch) | 16.9 |

EXAMPLE 41

(a) Preparation of poly(hydroxyether) prepolymer composition $D_6$

The reaction was carried out by the same method as that employed in the Example 38, except using the following Material A.

Thereafter, the resulting mixture was heated at a temperature of 40° C., for 10 hours, and cooled to room temperature.

| Material A: | Parts by wt. |
|---|---|
| 2,2-bis(4-hydroxyphenyl) propane (1) | 22.83 |
| Epichlorohydrin (0.8) | 7.41 |
| Tertiary butylalcohol | 23.0 |
| Sodium hydroxide (0.9) | 3.6 |
| Water | 17 |

(b) Preparation of poly(hydroxyether) based polyester

The reaction of poly(hydroxyether) prepolymer $D_6$ and bischloroformate of bis(4-hydroxycyclohexyl) methane was carried out by the same method as that employed in the Example 38, except using the following Material B and Material C.

Thereafter, the resulting mixture was washed five times with water, and the product was precipitated by adding methanol, and separated from the mixture, and dried under vacuum.

The properties of product are shown hereinafter.

Material B: Parts by wt.
Chloroform _____ 400
Sodium hydroxide (0.25) _____ 1
Water _____ 20
Tetramethylammonium chloride _____ 0.7
Poly(hydroxyether) prepolymer composition $D_6$
(0.2) whole volume by wt.

Material C:
Bischloroformate of bis (4-hydroxycyclohexyl)
methane (0.2) _____ 6.74
Chloroform _____ 200

Properties of product:
Melt index _____ 1.35
Heat distortion temperature (66 p.s.i.) °C. _ 106
Impact strength notched Izod (ft. lb./in.,
notch) _____ 15.1

EXAMPLE 42

(a) Preparation of poly(hydroxyether) prepolymer
composition $E_6$

The reaction was carried out by the same method as that employed in the Example 38, except using the following Material A.

Thereafter, the resulting mixture was heated at a temperature of 50° C., for 6 hours, and cooled to room temperature.

Poly(hydroxyether) prepolymer composition $E_6$
(0.15) whole volume (by wt.)

Material C:
Bischloroformate of 1,3-dihydroxycyclohexane
(0.15) _____ 3.62
Chloroform _____ 200

Properties of product:
Melt index _____ 0.52
Heat distortion temperature (66 p.s.i.)° C. __ 111
Impact strength, notched Izod (ft. lb./in.,
notch) _____ 13.7

EXAMPLE 43

The poly(hydroxyether) prepolymers $A_6$, $B_6$, $C_6$ and $D_6$ that were shown in the Examples 38, 39, 40 and 41 respectively, were washed with dilute hydrochloric acid and washed six times with water to remove sodium hydroxide and sodium chloride.

Then 400 parts of chloroform, 20 parts of water, 0.5 part trimethylbenzyl ammonium chloride and the same parts of sodium hydroxide as indicated in the Table VII, were added to poly(hydroxyether) prepolymer and dissolved by agitation.

Chloroform solution of bischloroformate of 2,2-bis(4-hydroxycyclohexyl) propane was added to the mixture and stirred for 30 minutes.

Thereafter the resulting mixture was washed five times with water, and the product was purified by the same manner as that employed in the Example 38.

The results were shown in the Table VII.

TABLE VII.—THE RELATIONS BETWEEN REACTION CONDITIONS OF POLY(HYDROXYETHER) PREPOLYMER AND HALOFORMATE AND PROPERTIES OF PRODUCED POLYESTER-ETHER RESINS

| | Added volume of— | | | | | Properties of produced resins | | |
|---|---|---|---|---|---|---|---|---|
| | Sodium hydroxide | | Bischloroformate of 2,2-bis(4-hydroxy-cyclohexyl) propane | | Reaction temperature (° C.) | Melt index at 220° C., 44 p.s.i. (g./10 min.) | Heat distortion temperature at 66 p.s.i. (° C.) | Impact strength, notched Izod (ft./ lb./in. notch) |
| Kind of poly(hydroxyether) prepolymer | Part | Mole | Part | Mole | | | | |
| 1 $A_6$ | 0.12 | 0.03 | 1.77 | 0.0050 | 5–10 | 1.36 | 100 | 13.7 |
| 2 $A_6$ | 0.12 | 0.03 | 1.94 | 0.0055 | 5–10 | 8.57 | 74 | 3.3 |
| 3 $B_6$ | 0.12 | 0.03 | 3.53 | 0.010 | 5–10 | 2.68 | 104 | 16.2 |
| 4 $B_6$ | 0 | 0 | 3.53 | 0.010 | 5–10 | <0.1 | This product did not substantially show plasticity | |
| 5 $C_6$ | 0.12 | 0.03 | 5.30 | 0.015 | 5–10 | 2.21 | 105 | 16.0 |
| 6 $C_6$ | 0.12 | 0.03 | 5.30 | 0.015 | 55–60 | <0.1 | This product did not substantially show plasticity | |
| 7 $D_6$ | 0.16 | 0.04 | 7.06 | 0.020 | 5–10 | 1.41 | 105 | 20.5 |
| 8 $D_6$ | 0.16 | 0.04 | 6.35 | 0.018 | 5–10 | 25.50 | 63 | 2.5 |

Material A: Parts by wt.
4,4'-dihydroxydiphenyl ether (1) _____ 20.2
β-methyl-epichlorohydrin (0.85) _____ 9.14
Tertiary butylalcohol _____ 23.0
Sodium hydroxide (0.95) _____ 3.8
Water _____ 17.4

(b) Preparation of poly(hydroxyether) based polyester

The reaction of poly(hydroxyether) prepolymer $E_6$ and bischloroformate of 1,3-dihydroxycyclohexane was carried out by the same method as that employed in the Example 38, except using the following Material B and Material C.

Thereafter, the resulting mixture was washed five times with water, and the product was precipitated by adding methanol, and separated from the mixture, and dried under vacuum.

The properties of product are shown hereinafter.

Material B: Parts by wt.
Chloroform _____ 400
Sodium hydroxide (0.2) _____ 0.8
Trimethylbenzylammonium chloride _____ 0.7
Water _____ 20

1, 3, 5 and 7 in the Table VII are the examples according to the invention, and 2, 4, 6 and 8 are the examples for comparison.

We claim:
1. A method for preparing a substantially linear, high molecular weight, poly(hydroxyether) based polyester resin which comprises (I) reacting a bisphenol with from about 0.70 to about 0.95 mole of an epihalohydrin per mole of the bisphenol, together with an alkali metal hydroxide catalyst in an aqueous medium at a temperature of about 10° C. to about 80° C., to produce (a) a poly(hydroxyether) prepolymer having two terminal phenolic hydroxyl groups and represented by the following formula

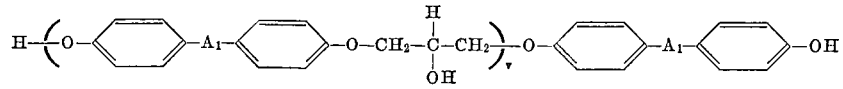

wherein $A_1$ represents a member selected from the group consisting of —O— and an isopropylidene group; $v$ ranges from 2 to 19; (II) condensing said prepolymer with (b) a dibasic acid halide selected from the group consisting of acid dihalides of aromatic dicarboxylic acids, acid dihalides of alicyclic dicarboxylic acids, bishaloformates of dihydric phenols and bishaloformates of dihydric alcohols, in the ratio of about 0.985 to about 1.015 phenolic hydroxyl groups of the poly(hydroxyether) prepolymer per one acid halide group of the dibasic acid halide, in the presence of a strongly basic compound as an acid acceptor and a catalytic amount of basic catalyst, and at a temperature of from about 0° to about 50° C.

2. A method for preparing a substantially linear, high molecular weight, poly(hydroxyether) based polyester resin which comprises (I) reacting a bisphenol selected from the group consisting of 2,2-bis-(4-hydroxyphenyl) propane and 4,4'-dihydroxydiphenyl-ether with from about 0.70 to 0.95 mole of an epihalohydrin per mole of the bisphenol, together with an alkali metal hydroxide catalyst in an aqueous medium at a temperature of about 10° C. to about 80° C., to produce (a) a poly(hydroxyether) prepolymer having two terminal phenolic hydroxyl groups and selected from the group consisting of the compounds represented by the following Formulas 1 and 2

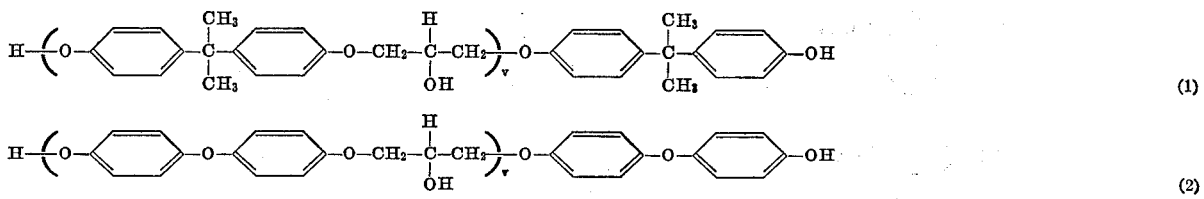

wherein $v$ ranges from 2 to 19; (II) condensing said prepolymer with (b) a dibasic acid halide selected from the group consisting of acid dihalides of aromatic dicarboxylic acids, acid diahalides of alicyclic dicarboxylic acids, bishaloformates of dihydric phenols and bishaloformates of dihydric alcohols, in the ratio of about 0.985 to about 0.015 phenolic hydroxyl groups of the poly(hydroxyether) prepolymer per one acid halide group of the dibasic acid halide, in the presence of a strongly basic compound as an acid acceptant and a catalytic amount of basic catalyst, and at a temperature of from about 0° to about 50° C.

3. A method of preparing a substantially linear, high molecular weight, poly(hydroxyether) based polyester resin which comprises (I) reacting a bisphenol selected from the group consisting of 2,2-bis-(4-hydroxyphenyl) propane and 4,4'-dihydroxydiphenyl-ether with from about 0.70 to 0.95 mole of an epihalohydrin per mole of the bisphenol, together with an alkali metal hydroxide catalyst in an aqueous medium at a temperature of about 10° C. to about 80° C., to produce (a) a poly(hydroxyether) prepolymer having two terminal phenolic hydroxyl groups and selected from the group consisting of the compounds represented by the following Formulas 1 and 2

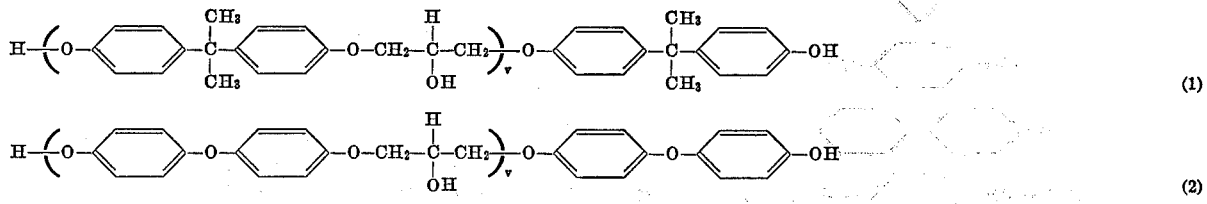

wherein $v$ ranges from 2 to 19; (II) condensing said prepolymer with (b) a dibasic acid halide selected from the group consisting of the compounds represented by the following Formulas 3, 4, 5, 6, 7, 8, 9, 10, 11, 12, 13, 14 and 15

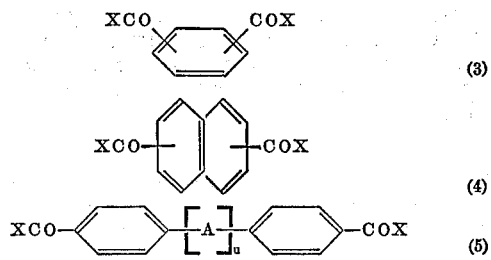

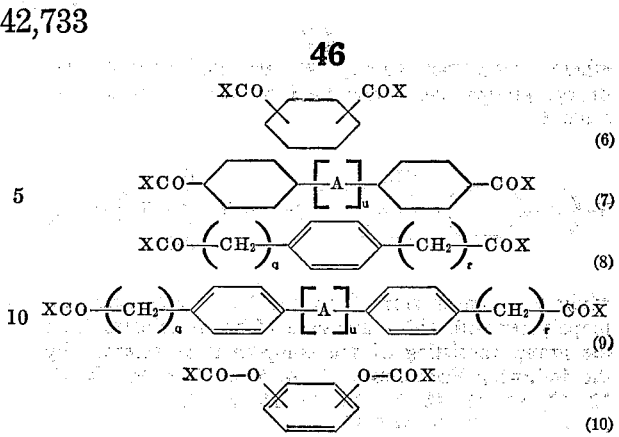

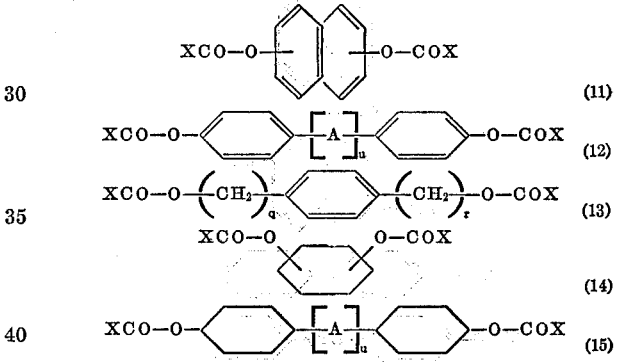

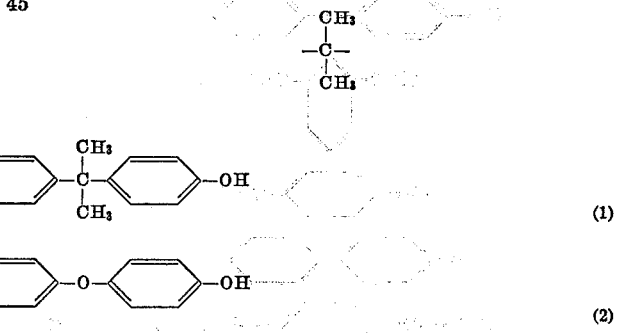

wherein X is a halogen atom selected from the group consisting of a chlorine atom and a bromine atom; A is a member selected from the group consisting of —CH$_2$—, $$-\underset{\underset{CH_3}{|}}{\overset{\overset{CH_3}{|}}{C}}-$$

—CH$_2$CH$_2$O—, —O— and —SO$_2$—, $q$ and $r$ range from 1 to 3; $u$ ranges from 0 to 1; in the ratio of about 0.985 to about 1.015 phenolic hydroxyl groups of the poly(hydroxyether) prepolymer per each —CO—X group of the dibasic acid halide, in the presence of a strongly basic compound as an acid acceptant and a catalytic amount of basic catalyst, and at a temperature of about 0° to about 50° C.

4. A method for preparing a substantially linear, high molecular weight, poly(hydroxyether) based polyester resin which comprises (I) reacting 2,2-bis-(4-hydroxyphenyl) propane with from about 0.70 to about 0.95 mole of an epihalohydrin per mole of 2,2-bis-(4-hydroxyphenyl) propane, together with an alkali metal hydroxide catalyst in an aqueous medium at a temperature of about 10° C. to about 80° C., to produce (a) a poly(hydroxyether) prepolymer having two terminal phenolic hydroxyl groups and represented by the following Formula 1

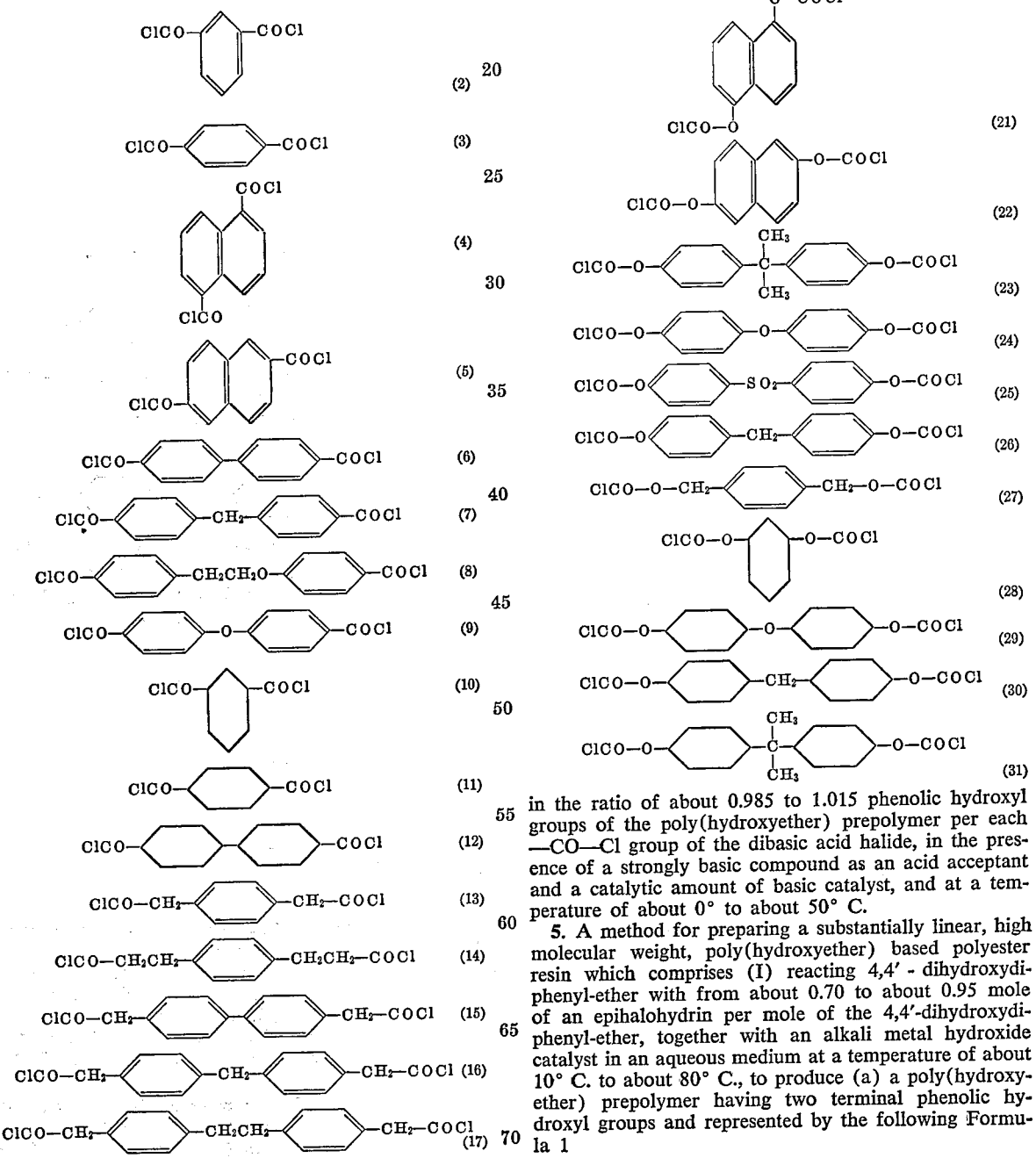

wherein $v$ ranges from 2 to 19; (II) condensing said prepolymer with (b) a dibasic acid halide selected from the group consisting of the compounds represented by the following Formulas 2, 3, 4, 5, 6, 7, 8, 9, 10, 11, 12, 13, 14, 15, 16, 17, 18, 19, 20, 21, 22, 23, 24, 25, 26, 27, 28, 29, 30 and 31 in the ratio of about 0.985 to 1.015 phenolic hydroxyl groups of the poly(hydroxyether) prepolymer per each —CO—Cl group of the dibasic acid halide, in the presence of a strongly basic compound as an acid acceptor and a catalytic amount of basic catalyst, and at a temperature of about 0° to about 50° C.

5. A method for preparing a substantially linear, high molecular weight, poly(hydroxyether) based polyester resin which comprises (I) reacting 4,4′-dihydroxydiphenyl-ether with from about 0.70 to about 0.95 mole of an epihalohydrin per mole of the 4,4′-dihydroxydiphenyl-ether, together with an alkali metal hydroxide catalyst in an aqueous medium at a temperature of about 10° C. to about 80° C., to produce (a) a poly(hydroxyether) prepolymer having two terminal phenolic hydroxyl groups and represented by the following Formula 1

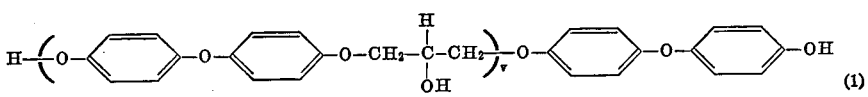

wherein $v$ ranges from 2 to 19; (II) condensing said prepolymer with (b) a dibasic acid halide selected from the group consisting of the compounds represented by the following Formulas 2, 3, 4, 5, 6, 7, 8, 9, 10, 11, 12, 13, 14, 15, 16, 17, 18, 19, 20, 21, 22, 23, 24, 25, 26, 27, 28, 29, 30 and 31

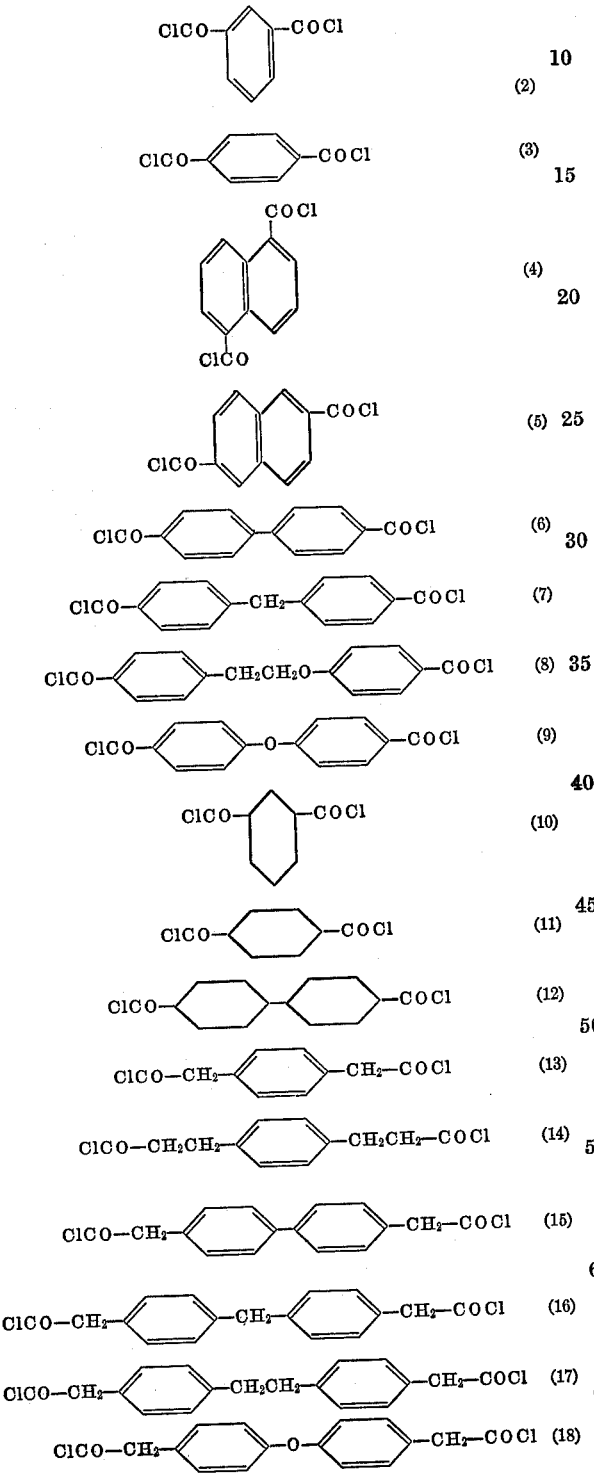

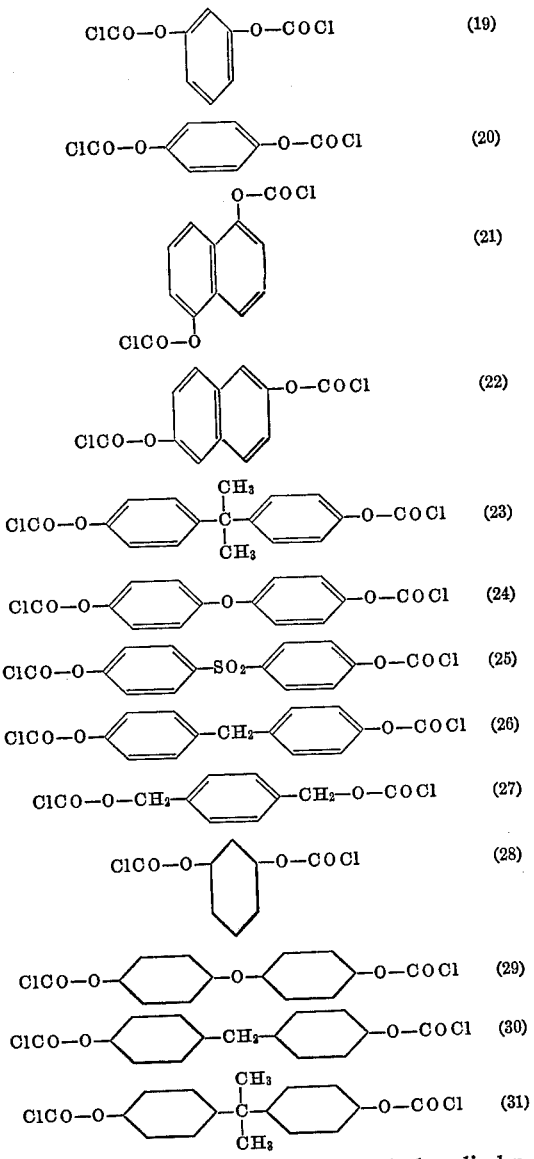

in the ratio of about 0.985 to about 1.015 phenolic hydroxyl groups of the poly(hydroxyether) prepolymer per each —CO—Cl group of the dibasic acid halide, in the presence of a strongly basic compound as an acid acceptor and a catalytic amount of basic catalyst, and at a temperature of about 0° to about 50° C.

References Cited

UNITED STATES PATENTS 2,734,876  2/1956  Bradley.
3,110,698  11/1963  Laakso et al.
3,256,226  6/1966  Fekete et al.
2,504,518  4/1950  Greenlee.

WILLIAM SHORT, Primary Examiner

L. P. QUAST, Assistant Examiner

U.S. Cl. X.R.

260—49